(12) United States Patent
Naidoo et al.

(10) Patent No.: US 10,514,768 B2
(45) Date of Patent: Dec. 24, 2019

(54) GESTURES AND TOUCH IN OPERATOR INTERFACE

(71) Applicant: FISHER-ROSEMOUNT SYSTEMS, INC., Round Rock, TX (US)

(72) Inventors: Julian K. Naidoo, Cedar Park, TX (US); Gary K. Law, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 391 days.

(21) Appl. No.: 15/070,821

(22) Filed: Mar. 15, 2016

(65) Prior Publication Data
US 2017/0269696 A1    Sep. 21, 2017

(51) Int. Cl.
*G06F 3/0488* (2013.01)
*G06Q 10/06* (2012.01)
*G06F 3/01* (2006.01)
*G05B 19/409* (2006.01)
*G06F 3/00* (2006.01)
(Continued)

(52) U.S. Cl.
CPC .......... *G06F 3/017* (2013.01); *G05B 19/409* (2013.01); *G06F 3/005* (2013.01); *G06F 3/042* (2013.01); *G06F 3/04845* (2013.01); *G06F 3/04847* (2013.01); *G06F 3/04883* (2013.01); *G06Q 10/06* (2013.01); *G05B 2219/23026* (2013.01); *G05B 2219/32128* (2013.01); *G05B 2219/35444* (2013.01)

(58) Field of Classification Search
None
See application file for complete search history.

(56) References Cited

U.S. PATENT DOCUMENTS

| | | | |
|---|---|---|---|
| 7,489,305 B2 * | 2/2009 | Salisbury ............ | G06F 3/04845 345/173 |
| 7,629,966 B2 * | 12/2009 | Anson ................... | G06F 3/0488 178/18.01 |
| 9,110,541 B1 * | 8/2015 | Zhou ....................... | G06F 3/042 |

(Continued)

OTHER PUBLICATIONS

UKIPO Search Report in Application No. GB1703256.6 dated Aug. 16, 2017.
(Continued)

*Primary Examiner* — Beau D Spratt
(74) *Attorney, Agent, or Firm* — Marshall, Gerstein & Borun LLP

(57) ABSTRACT

Techniques for adjusting process variables in a process plant using gesture-based input on a user interface device include presenting a graphic representation associated with a process plant entity in the process plant and an indication of a process variable value corresponding to the process plant entity as measured with the actual process plant and providing a user control for receiving gesture-based input at a location on the user interface device corresponding to the graphic representation associated with the process plant entity to adjust the process variable value. In response to receiving gesture-based input from an operator to adjust the process variable value for the corresponding process plant entity, the user interface device presents an adjusted process variable value and sets the process variable in the actual process plant to the adjusted process variable value.

20 Claims, 15 Drawing Sheets

(51) Int. Cl.
*G06F 3/0484* (2013.01)
*G06F 3/042* (2006.01)

(56) References Cited

U.S. PATENT DOCUMENTS

| | | | |
|---|---|---|---|
| 2007/0078966 A1* | 4/2007 | Bromley | G06F 9/451 |
| | | | 709/224 |
| 2009/0174673 A1 | 7/2009 | Ciesla | |
| 2010/0095233 A1 | 4/2010 | Skourup et al. | |
| 2011/0096007 A1 | 4/2011 | Kitagawa et al. | |
| 2011/0246943 A1* | 10/2011 | Fujibayashi | G06F 3/04847 |
| | | | 715/833 |
| 2012/0218214 A1* | 8/2012 | Ciesla | G06F 1/1616 |
| | | | 345/173 |
| 2012/0223959 A1* | 9/2012 | Lengeling | G06F 3/04883 |
| | | | 345/619 |
| 2012/0235935 A1* | 9/2012 | Ciesla | G06F 3/0202 |
| | | | 345/173 |
| 2014/0046458 A1* | 2/2014 | Timsjo | G05B 19/409 |
| | | | 700/28 |
| 2014/0059427 A1 | 2/2014 | Dombrowski et al. | |
| 2014/0168110 A1* | 6/2014 | Araki | G06F 3/016 |
| | | | 345/173 |
| 2014/0245226 A1 | 8/2014 | Butscher et al. | |
| 2014/0274123 A1* | 9/2014 | Nixon | G05B 11/01 |
| | | | 455/456.1 |
| 2014/0358256 A1* | 12/2014 | Billi | G05B 15/02 |
| | | | 700/83 |
| 2015/0355611 A1* | 12/2015 | Laycock | G05B 15/02 |
| | | | 700/83 |
| 2015/0363095 A1* | 12/2015 | Jin | G06F 3/04817 |
| | | | 715/765 |
| 2017/0131891 A1* | 5/2017 | Novet | G06F 3/0416 |

OTHER PUBLICATIONS

"Taking Touch Screen Interfaces Into a New Dimension," Tactus Technology, 2012—available at <http://tactustechnology.com/wp-content/uploads/2013/09/Tactus_Technology_White_Paper.pdf>.

* cited by examiner

GESTURES AND TOUCH IN OPERATOR INTERFACE

FIELD OF THE DISCLOSURE

This disclosure relates generally to process control systems, and, more particularly, to a user interface device which receives gesture based user input to control on-line operation of the process plant.

BACKGROUND

Distributed process control systems, like those used in chemical, petroleum or other processes, typically include one or more process controllers and input/output (I/O) devices communicatively coupled to at least one host or operator workstation and to one or more field devices via analog, digital or combined analog/digital buses, or via a wireless communication link or network. The field devices, which may be, for example, valves, valve positioners, switches, and transmitters (e.g., temperature, pressure, level and flow rate sensors), are located within the process environment and generally perform physical or process control functions, such as opening or closing valves, or measuring process parameters to control one or more processes executing within the process plant or system. Smart field devices, such as field devices conforming to the well-known Fieldbus protocol may also perform control calculations, alarming functions, and other control functions commonly implemented within a controller. The process controllers, which are also typically located within the plant environment, receive signals indicative of process measurements made by sensors or field devices and/or other information pertaining to the field devices and execute a controller application that runs, for example, different control modules that make process control decisions, generate control signals based on the received information, and coordinate with the control modules or blocks being performed in the field devices, such as HART®, Wireless HART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers, or computing devices, data historians, report generators, centralized databases, or other centralized administrative computing devices that are typically, but not always, placed in control rooms or other locations away from the harsher plant environment. Each of these hardware devices typically, though not always, is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers, and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more operator workstations or computing devices, enables users to create or change process control modules and download these process control modules via a data highway to dedicated distributed controllers. Typically, these control modules are made up of communicatively interconnected function blocks, which perform functions within the control scheme based on inputs thereto and which provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the operator interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As noted above, operator display applications are typically implemented on a system wide basis in one or more of the workstations and provide displays to the operator or maintenance persons regarding the operating state of the control system or the devices within the plant. Typically, these displays take the form of alarming displays that receive alarms generated by controllers or devices within the process plant, control displays indicating the operating state of the controllers and other devices within the process plant, maintenance displays indicating the operating state of the devices within the process plant, etc. These displays are generally configured to display, in known manners, information or data received from the process control modules or the devices within the process plant. In some known systems, displays have a graphic associated with a physical or logical element that is communicatively tied to the physical or logical element to receive data about the physical or logical element. The graphic may be changed on the display screen based on the received data to illustrate, for example, that a tank is half full, to illustrate the flow measured by a flow sensor, etc.

In some known systems, operators use I/O devices such as a keyboard and a mouse to control the process control modules or the devices within the process plant. For example, an operator may click on a graphic representation of a tank and as a result, the operator display application displays a faceplate for allowing the operator to set the level in the tank using a slider bar, for example. Traditionally, operators interacted with physical control panels which involved flipping switches, turning knobs, etc., to control the process or the devices within the process plant. While I/O devices such as a keyboard and mouse can be used to control the process, such devices allow for only one target (e.g., a single tank) to be adjusted at a time. Moreover, I/O devices can be cumbersome increasing the size and weight of a personal computing device and making it difficult for personal computing devices to be portable. Furthermore, controlling process control modules and devices within the process plant using faceplates may be counterintuitive compared to traditional methods of interacting with physical control panels by flipping switches, turning knobs, etc., and receiving haptic feedback when the adjustment may lead to a dangerous condition in the process plant.

SUMMARY

A server communicates with a user interface device to display a display screen which allows an operator to control the operation of process plant entities within a process plant via gesture-based input such as swipe, drag, tap, pinch, flick, spread, rotate, and slide gestures. The user interface device may be connected to on-line process measurements as well as the on-line process plant entities such that the measurements may be displayed to the operator and then adjusted according to operator input. More specifically, the user interface device may display a graphic representation of the process plant including each of the process plant entities, connections between the process plant entities, and process variable values which may correspond to the on-line process measurements.

For example, the user interface device may display a graphic representation of a tank including a graphic representation of the tank level based on the actual tank level value from the on-line process plant. The operator may then adjust the tank level by placing her finger over the graphic representation of the tank and sliding her finger upwards, for example, to increase the tank level and downwards to decrease the tank level. In response to the operator sliding her finger upwards, the tank level in the graphic representation may increase according to the amount the operator slides her finger. Additionally, the user interface device may communicate with a controller to adjust the tank level in the on-line process plant.

The user interface device may receive multi-gesture input from the operator or from several operators, such that the operator(s) control the operation of multiple process plant entities simultaneously. For example, using her right hand, the operator may place her finger over the graphic representation of the tank and slide her finger upwards to increase the tank level, while she uses her left hand to close a valve by placing two fingers over the valve and pinching them together. In one embodiment, the operator may not need to make physical contact with the user interface device and instead gestures may be detected using one or more cameras in the user interface device.

DETAILED DESCRIPTION

Figure 1A:
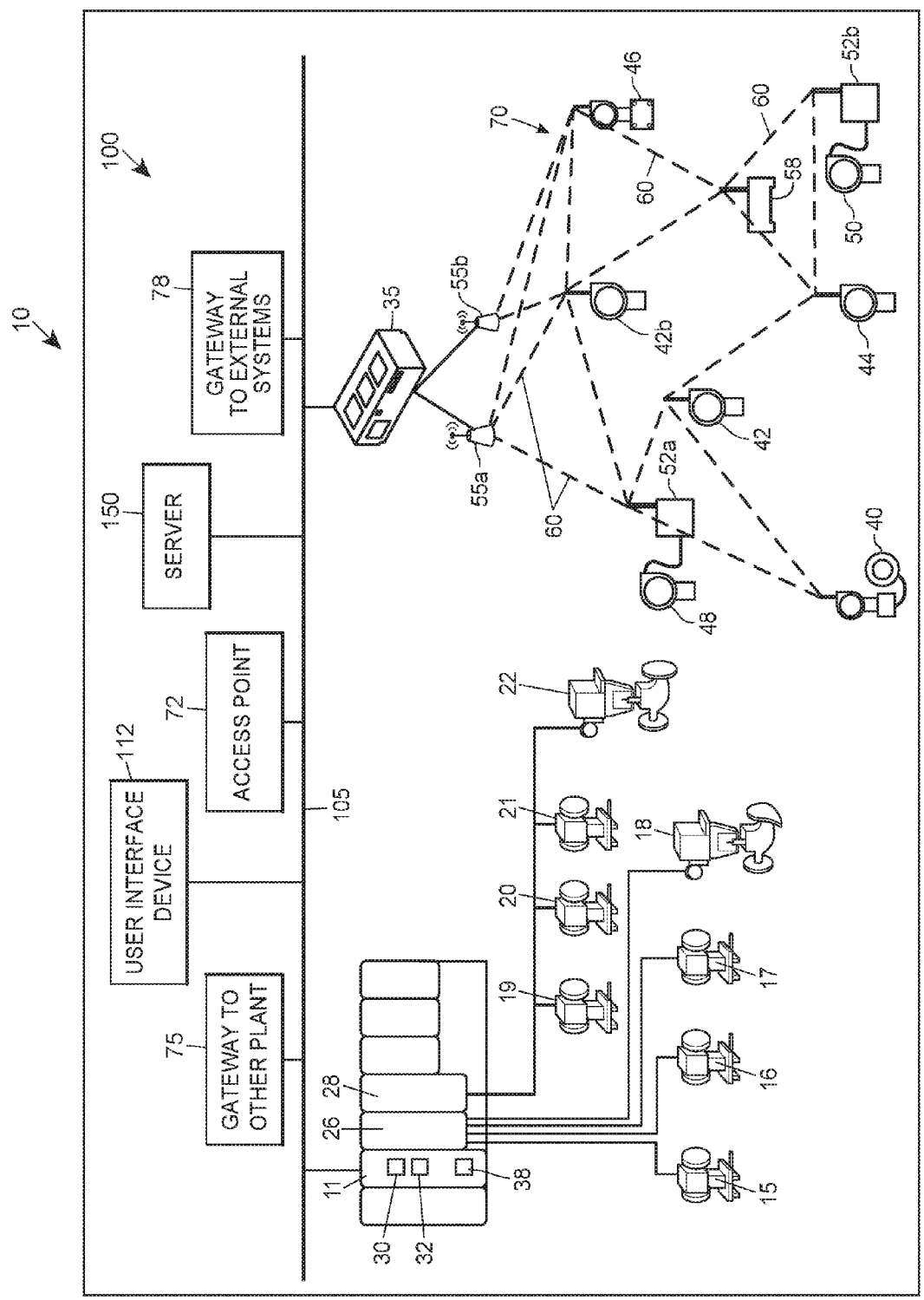
FIG. 1A is a block diagram of a distributed process control network located within a process plant including a user interface device which allows an operator to control the operation of process plant entities within a process plant via gesture-based input.

FIG. 1A is a block diagram of an exemplary process control network 100 operating in a process control system or process plant 10. The process control network 100 may include a network backbone 105 providing connectivity directly or indirectly between a variety of other devices. The devices coupled to the network backbone 105 include, in various embodiments, combinations of access points 72, gateways 75 to other process plants (e.g., via an intranet or corporate wide area network), gateways 78 to external systems (e.g., to the Internet), UI devices 112 which may be stationary (e.g., a traditional operator workstation) or mobile computing devices (e.g., a mobile device smart-phone), servers 150, controllers 11, input/output (I/O) cards 26 and 28, wired field devices 15-22, wireless gateways 35, and wireless communication networks 70. The communication networks 70 may include wireless devices 40-58, which include wireless field devices 40-46, wireless adapters 52a and 52b, access points 55a and 55b, and router 58. The wireless adapters 52a and 52b may be connected to non-wireless field devices 48 and 50, respectively. The controller 11 may include a processor 30, a memory 32, and one or more control routines 38. Though FIG. 1A depicts only a single one of some of the devices connected to the network backbone 105, it will be understood that each of the devices could have multiple instances on the network backbone 105 and, in fact, that the process plant 10 may include multiple network backbones 105.

The UI devices 112 may be communicatively connected to the controller 11 and the wireless gateway 35 via the network backbone 105. The controller 11 may be communicatively connected to wired field devices 15-22 via input/output (I/O) cards 26 and 28 and may be communicatively connected to wireless field devices 40-46 via the network backbone 105 and a wireless gateway 35. The controller 11 may operate to implement a batch process or a continuous process using at least some of the field devices 15-22 and 40-46. The controller 11, which may be, by way of example, the DeltaV™ controller sold by Emerson Process Management, is communicatively connected to the process control network backbone 105. The controller 11 may be also communicatively connected to the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1A, the controller 11, the field devices 15-22 and the I/O cards 26, 28 are wired devices, and the field devices 40-46 are wireless field devices.

In operation of the UI device 112, the UI device 112 may, in some embodiments, execute a user interface ("UI"), allowing the UI device 112 to accept input via an input interface and provide output at a display. The UI device 112 may receive data (e.g., process related data such as process parameters, log data, sensor data, and/or any other data that may be captured and stored), from the server 150. In other embodiments, the UI may be executed, in whole or in part, at the server 150, where the server 150 may transmit display data to the UI device 112. The UI device 112 may receive UI data (which may include display data and process parameter data) via the backbone 105 from other nodes in the process control network 100, such as the controller 11, the wireless gateway 35, or the server 150. Based on the UI data received at the UI device 112, the UI device 112 provides output (i.e., visual representations or graphics) representing aspects of the process associated with the process control network 100, allowing the user to monitor the process. The user may also affect control of the process by providing input at the UI device 112. To illustrate, the UI device 112 may provide graphics representing, for example, a tank filling process. In such a scenario, the user may read a tank level measurement and decide that the tank needs to be filled. The user may interact with an inlet valve graphic displayed at the UI device 112 and input a command causing the inlet valve to open.

In certain embodiments, the UI device 112 may implement any type of client, such as a thin client, web client, or thick client. For example, the UI device 112 may depend on other nodes, computers, UI devices, or servers for the bulk of the processing necessary for operation of the UI device 112, as might be the case if the UI device is limited in memory, battery power, etc. (e.g., in a wearable device). In such an example, the UI device 112 may communicate with the server 150 or with another UI device, where the server 150 or other UI device may communicate with one or more other nodes (e.g., servers) on the process control network 100 and may determine the display data and/or process data to transmit to the UI device 112. Furthermore, the UI device 112 may pass any data related to received user input to the server 150 so that the server 150 may process the data related to user input and operate accordingly. In other words, the UI device 112 may do little more than render graphics and act as a portal to one or more nodes or servers that store the data and execute the routines necessary for operation of the UI device 112. A thin client UI device offers the advantage of minimal hardware requirements for the UI device 112.

In other embodiments, the UI device 112 may be a web client. In such an embodiment, a user of the UI device 112 may interact with the process control system via a browser at the UI device 112. The browser enables the user to access data and resources at another node or server 150 (such as the server 150) via the backbone 105. For example, the browser may receive UI data, such as display data or process parameter data, from the server 150, allowing the browser to depict graphics for controlling and/or monitoring some or all of the process. The browser may also receive user input (such as a mouse click on a graphic). The user input may cause the browser to retrieve or access an information resource stored on the server 150. For example, the mouse click may cause the browser to retrieve (from the server 150) and display information pertaining to the clicked graphic.

In yet other embodiments, the bulk of the processing for the UI device 112 may take place at the UI device 112. For example, the UI device 112 may execute the previously discussed UI, state determination routine, and context awareness routine. The UI device 112 may also store, access, and analyze data locally.

In operation, a user may interact with the UI device 112 to monitor or control one or more devices in the process control network 100, such as any of the field devices 15-22 or the devices 40-48. The user may interact with the UI device 112, for example, to modify or change a parameter associated with a control routine stored in the controller 11. The processor 30 of the controller 11 implements or oversees one or more process control routines (stored in a memory 32), which may include control loops. The processor 30 may communicate with the field devices 15-22 and 40-46 and with other nodes that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be implemented by a user through the UI device 112. The control routines may be stored in any desired type of memory, such as random access memory (RAM), or read only memory (ROM) Likewise, the control routines may be hard-coded into, for example, one or more EPROMs, EEPROMs, application specific integrated circuits (ASICs), or any other hardware or firmware elements. Thus, the controller 11 may be configured (by a user using a UI device 112 in certain embodiments) to implement a control strategy or control routine in any desired manner.

In some embodiments of the UI device 112, a user may interact with the UI device 112 to implement a control strategy at the controller 11 using what are commonly referred to as function blocks, wherein each function block is an object or other part (e.g., a subroutine) of an overall control routine and operates in conjunction with other function blocks (via communications called links) to implement process control loops within the process control system. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system. Of course, hybrid and other types of function blocks exist. The function blocks may have graphical representations that are provided at the UI device 112, allowing a user to easily modify the types of function blocks, the connections between the function blocks, and the inputs/outputs associated with each of function blocks implemented in the process control system. Function blocks may be stored in and executed by the controller 11, which is typically the case when these function blocks are used for, or are associated with standard 4-20 mA devices and some types of smart field devices such as HART devices, or may be stored in and implemented by the field devices themselves, which can be the case with Fieldbus devices. The controller 11 may include one or more control routines 38 that may implement one or more control loops. Each control loop is typically referred to as a control module, and may be performed by executing one or more of the function blocks.

Referring still to FIG. 1A, the wireless field devices 40-46 communicate in a wireless network 70 using a wireless protocol, such as the Wireless HART protocol. In certain embodiments, the UI device 112 may be capable of communicating with the wireless field devices 40-46 using the wireless network 70. Such wireless field devices 40-46 may directly communicate with one or more other nodes of the process control network 100 that are also configured to communicate wirelessly (using the wireless protocol, for example). To communicate with one or more other nodes that are not configured to communicate wirelessly, the wireless field devices 40-46 may utilize a wireless gateway 35 connected to the backbone 105. Of course, the field devices 15-22 and 40-46 could conform to any other desired standard(s) or protocols, such as any wired or wireless protocols, including any standards or protocols developed in the future.

The wireless gateway 35 is an example of a provider device 110 that may provide access to various wireless devices 40-58 of a wireless communication network 70. In particular, the wireless gateway 35 provides communicative coupling between the wireless devices 40-58 and other nodes of the process control network 100 (including the controller 11 of FIG. 1A). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers.

Similar to the wired field devices 15-22, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway, and other wireless nodes 52-58 of the wireless network 70 are producers and consumers of wireless communication packets.

In some scenarios, the wireless network 70 may include non-wireless devices. For example, a field device 48 of FIG. 1A may be a legacy 4-20 mA device and a field device 50 may be a traditional wired HART device. To communicate within the network 70, the field devices 48 and 50 may be connected to the wireless communication network 70 via a wireless adaptor (WA) 52a or 52b. Additionally, the wireless adaptors 52a, 52b may support other communication protocols such as Foundation® Fieldbus, PROFIBUS, DeviceNet, etc. Furthermore, the wireless network 70 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 70. The wireless devices 32-46 and 52-58 may communicate with each other and with the wireless gateway 35 over wireless links 60 of the wireless communication network 70.

In certain embodiments, the process control network 100 may include other nodes connected to the network backbone 105 that communicate using other wireless protocols. For example, the process control network 100 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices to communicate over a respective wireless network that is different from the wireless network 70 and that supports a different wireless protocol than the wireless network 70. In some embodiments, the UI device 112 communicates over the process control network 100 using a wireless access point 72. In some scenarios, in addition to portable computing devices, one or more process control devices (e.g., controller 11, field devices 15-22, or wireless devices 35, 40-58) may also communicate using the wireless network supported by the access points 72.

Additionally or alternatively, the provider devices may include one or more gateways 75, 78 to systems that are external to the immediate process control system. In such embodiments, the UI device 112 may be used to control, monitor, or otherwise communicate with said external systems. Typically, such systems are customers or suppliers of information generated or operated on by the process control system. For example, a plant gateway node 75 may communicatively connect the immediate process plant 10 (having its own respective process control data network backbone 105) with another process plant having its own respective network backbone. In an embodiment, a single network backbone 105 may service multiple process plants or process control environments.

In another example, the plant gateway node 75 may communicatively connect the immediate process plant to a legacy or prior art process plant that does not include a process control network 100 or backbone 105. In this example, the plant gateway node 75 may convert or translate messages between a protocol utilized by the process control big data backbone 105 of the plant 10 and a different protocol utilized by the legacy system (e.g., Ethernet, Profibus, Fieldbus, DeviceNet, etc.). In such an example, the UI device 112 may be used to control, monitor, or otherwise communicate with systems or networks in said legacy or prior art process plant.

The provider devices may include one or more external system gateway nodes 78 to communicatively connect the process control network 100 with the network of an external public or private system, such as a laboratory system (e.g., Laboratory Information Management System or LIMS), a personnel rounds database, a materials handling system, a maintenance management system, a product inventory control system, a production scheduling system, a weather data system, a shipping and handling system, a packaging system, the Internet, another provider's process control system, or other external systems. The external system gateway nodes 78 may, for example, facilitate communication between the process control system and personnel outside of the process plant (e.g., personnel at home).

Although FIG. 1A illustrates a single controller 11 with a finite number of field devices 15-22 and 40-46, this is only an illustrative and a non-limiting embodiment. Any number of controllers 11 may be included in the provider devices of the process control network 100, and any of the controllers 11 may communicate with any number of wired or wireless field devices 15-22, 40-46 to control a process in the plant 10. Furthermore, the process plant 10 may also include any number of wireless gateways 35, routers 58, access points 55, wireless process control communication networks 70, access points 72, and/or gateways 75, 78.

Figure 1B:
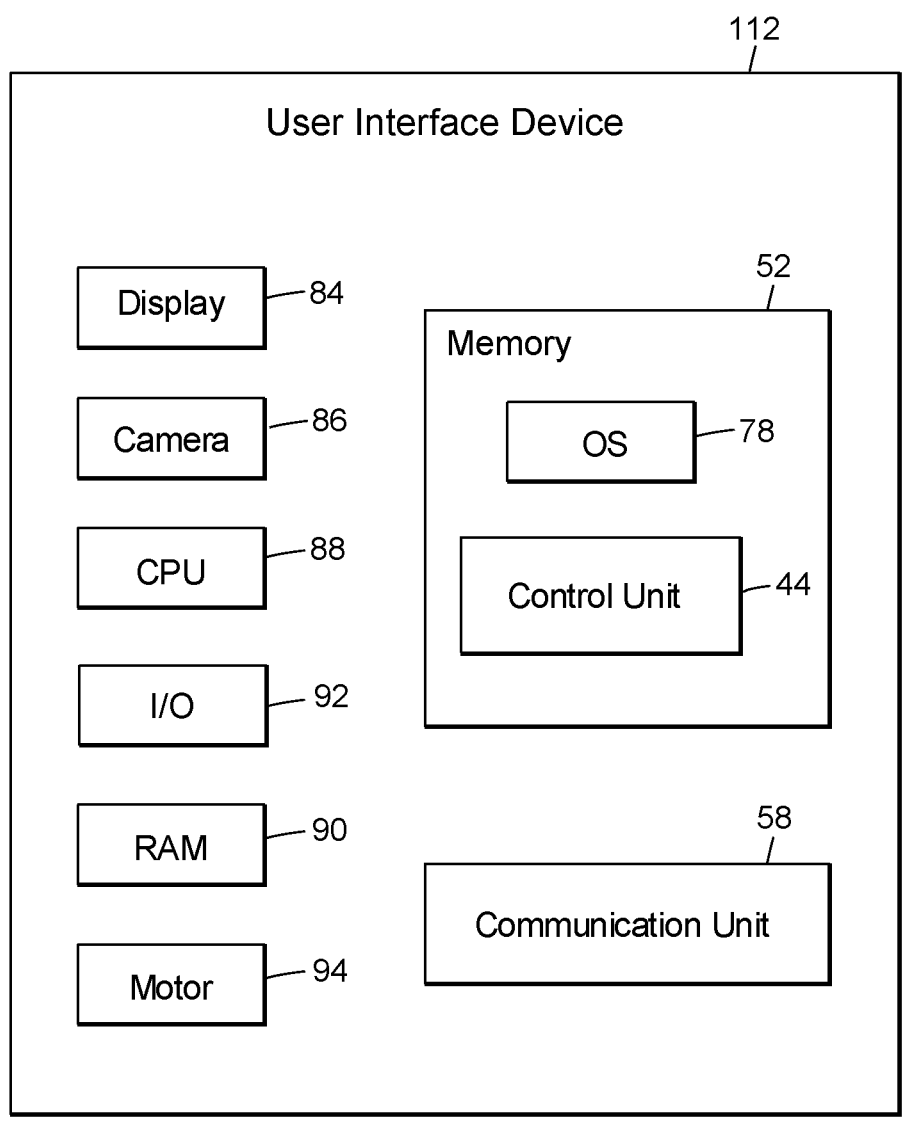
FIG. 1B is a block diagram of an example user interface device schematically illustrated in FIG. 1A.

FIG. 1B illustrates a block diagram of an example UI device 112. The UI device 112 may be a desktop computer such as a traditional operator workstation, a control room display, or a mobile computing device such as a laptop computer, a tablet computer, a mobile device smart-phone, a personal digital assistant (PDA), a wearable computing device, or any other suitable client computing device. The UI device 112 may include a display 84, a vibration motor 94 for causing the UI device 112 to vibrate, and one or more cameras 86 or image sensors. The one or more cameras 86 may include depth sensors, such as Light Detection and Ranging (LIDAR) or any other suitable 3D image sensors. Further, the UI device 112 includes one or more processors or CPUs 88, a memory 52, a random-access memory (RAM) 90, an input/output (I/O) circuit 92, and a communication unit 58 to transmit and receive data via a local area network, wide area network, or any other suitable network. The UI device 112 may communicate with the controllers 11, the server 150 and/or any other suitable computing device.

The memory 52 may include an operating system 72, and a control unit 44 for controlling the display 88 and communicating with the controllers 11 to control on-line operation of the process plant. In some embodiments, the server 150 may transmit a graphic representation of a portion of the process plant to the UI device 112 and in turn, the control unit 44 may cause the graphic representation of the portion of the process plant to be presented on the display 88. Additionally, the control unit 44 may obtain user input from the I/O circuit 92, such as gesture-based input from the operator (also referred to herein as a user) and translate the gesture-based input into an adjustment to a process variable. In some embodiments, the control unit 44 may then adjust the process variable value on the display 88 in accordance with the gesture-based input from the operator and may provide instructions to the controllers 11 to adjust the process variable in the process plant. In other embodiments, the control unit 44 may communicate the translated gesture-based input to the server 150 which may alter the graphic representation of the process plant, transmit the altered graphic representation to the UI device 112 for display, and provide instructions to the controllers 11 to adjust the process variable in the process plant.

Figure 2:
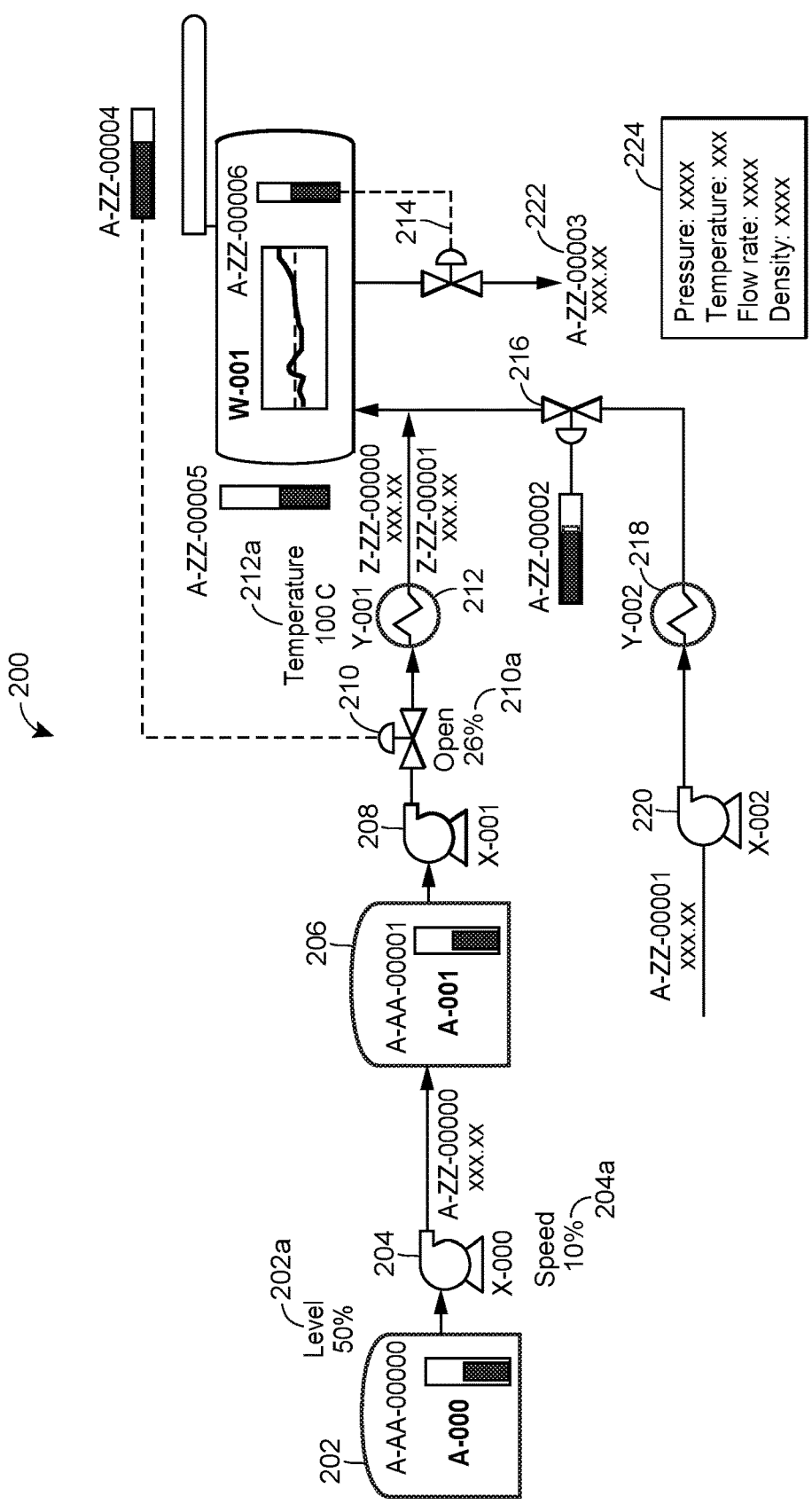
FIG. 2 is a screen display depicting a portion of a process plant.

FIG. 2 illustrates an example screen display 200 depicting a portion of the process plant 10. In some embodiments, the screen display 200 may be presented on the display 84 of the UI device 112. The screen display 200 may include graphic representations associated with process plant entities, such as a graphic representation of the actual process plant entity, a graphic representation of a faceplate for the process plant entity, or any other suitable graphic representation associated with a process plant entity.

As illustrated in FIG. 2, the screen display 200 includes several graphic representations of process plant entities: two tanks 202, 206, three pumps 204, 208, 220, three valves 210, 214, 216, two heat exchangers 212, 218, and an output 222. Moreover, the screen display 200 may include process variable values associated with the different process plant entities, such as a tank level value 202a associated with the tank 202, a pump speed 204a associated with the pump 204, a valve opening percentage 210a associated with the valve 210, and a temperature 212a associated with the heat exchanger 212. Set point values may also be displayed along with the process variable values on the screen display 200. Additionally, the screen display 200 may include indications 224 of the pressure, temperature, flow rate, density, etc. of the output 222. Each of the process variable values displayed on the screen display 200 may be delivered from an actual reference transmitter within the process control system so that the process variable values reflect actual measurements within the on-line process plant.

Figure 3:
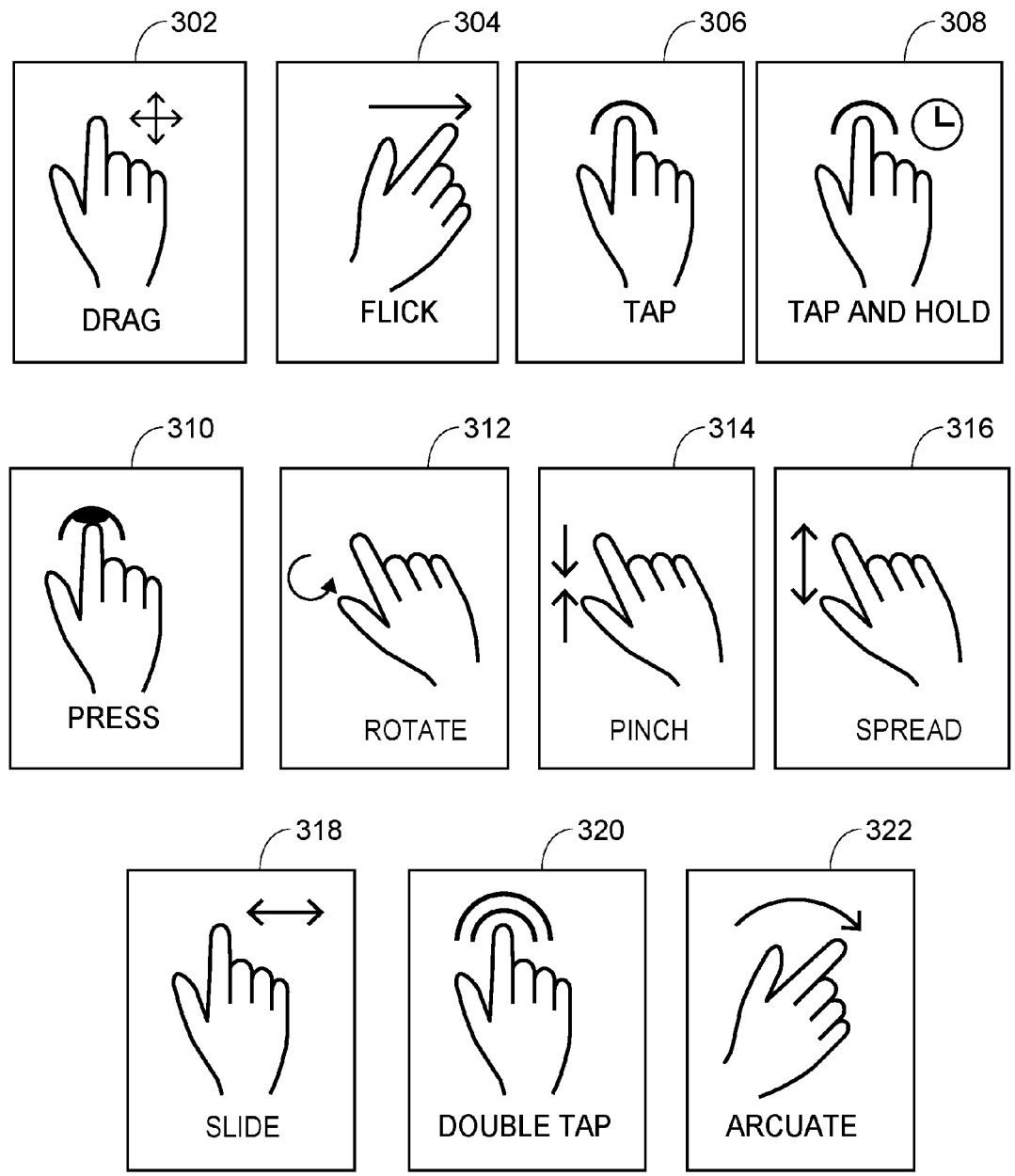
FIG. 3 illustrates various gesture-based input which may be used in connection with the user interface device to adjust process variable values in the process plant.

FIG. 3 illustrates various examples of gesture-based input which may be used in connection with the UI device 112 to adjust process variable values in the process plant. To adjust a process variable value associated with a process plant entity, the operator may touch a location on the UI device 112 corresponding to the process plant entity and perform one of the gestures 302-322. The gestures 302-322 may include a drag gesture 302 which may be used, for example, to increase or decrease a level or value within the process plant.

The drag gesture 302 may be used to adjust a tank level for a tank, a temperature setting for a heat exchanger, etc. The tank level or temperature setting may increase or decrease based on the length of the drag. In some embodiments, the process variable value may increase or decrease in proportion to the length of the drag. For example, the process variable value may increase when the operator drags her finger upward or to the right, and may decrease when the operator drags her finger downward or to the left. If the operator drags her finger 1 cm upward, for example, the process variable may increase by 10 percent. If the operator drags her finger 2 cm upward, for example, the process variable may increase by 20 percent, and so on. Additionally, the process variable may increase or decrease based on and/or in proportion to an amount of time for the drag. The process variable may continue to increase or decrease the longer the operator holds the dragged position. For example, when the operator drags her finger upward and holds down for 10 seconds, the process variable may increase by 10 percent, and when the operator holds down for 10 more seconds, the process variable may increase by 20 percent. In other embodiments, the process variable may change based on and/or in proportion to a combination of the length of the drag gesture and the amount of time for the drag gesture. For example, the rate of change for a process variable may be based on and/or in proportion to the distance of the drag gesture. In this manner, if the operator drags her finger 1 cm upward, for example, the rate of change for the process variable may be 10 percent per second. When the operator holds her finger down after dragging 1 cm upward for 1 second, the process variable may increase by 10 percent, when she holds her finger down for 2 seconds, the process variable may increase by 20 percent, etc. Then when the operator drags her finger another cm upward so she has dragged her finger 2 cm upward from the initial position, the rate of change for the process variable may be 20 percent per second, for example.

A flick gesture 304 may be used to rapidly increase or decrease a level or value within the process plant. For example, for a drag gesture 302 the tank level may increase/decrease by ten percent for every centimeter that the operator moves her finger, whereas for a flick gesture 304 the tank level may increase/decrease by fifty percent for each flick.

A tap gesture 306 and/or a tap and hold gesture 308 may be used to view additional process variables associated with a process plant entity. For example, if the operator taps the valve 210 as shown in FIG. 2, in addition to the valve opening percentage 210a associated with the valve 210, the screen display 200 may also show a flow rate through the valve 210 and/or any other additional process variables associated with the valve 210. In another embodiment, the tap gesture 306 may be used to view a scale of values for adjusting a process variable value. For example, by tapping on the heat exchanger 212, a scale of temperatures from 80 degrees Celsius to 120 degrees Celsius may appear on the screen display 200. Accordingly, the operator may perform a drag gesture 302 to adjust the temperature setting within the 80-120 degree range. In another example, the scale may include percentages from 0-100 percent, from 20-80 percent, or including any other suitable range. In yet other embodiments, the tap gesture 306 and/or the tap and hold gesture 308 may be used to view a corresponding faceplate for a process plant entity. For example, in response to a tap gesture 306, a scale of values for adjusting a process variable value may be displayed. When the user holds the tap gesture 308 for more than a threshold amount of time (e.g., 2 seconds), the scale of values may be replaced with a corresponding faceplate for the process plant entity.

A press gesture 310 may be used to lock or unlock a process variable such that the operator or other operators cannot adjust the process variable value when the process variable is locked. This may be performed for safety reasons so that process variables which can lead to dangerous conditions when changed, cannot be adjusted. In another example, an operator may lock a process variable when the operator adjusts other process variables so that he does not accidentally adjust the process variable which he previously set to a desired value. In some embodiments, when a process variable is unlocked, the operator may press on the UI device 112 at a location corresponding to the associated process plant entity to lock all process variables for the process plant entity. Then when the process variables for the associated process plant entity are locked, the operator may once again press on the UI device 112 at a location corresponding to the associated process plant entity to unlock all process variables for the process plant entity. This is described in more detail below with reference to FIGS. 5A-D.

Another gesture an operator may perform, in some embodiments includes a rotate gesture 312 which may be used to imitate the turning of a knob. The operator may use the rotate gesture 312 to adjust the speed of a pump, to adjust the temperature setting for a heat exchanger, etc. For example, if the operator rotates his fingers to the right, the speed of the pump may increase and if he rotates his fingers to the left, the speed of the pump may decrease. The speed of the pump may increase or decrease based on the amount of rotation. In some embodiments, the process variable value may increase or decrease in proportion to the amount of rotation. For example, if the operator performs a quarter turn, the speed of the pump may increase/decrease by 25 percent, if the operator performs a half turn, the speed of the pump may increase/decrease by 50 percent, and if the operator performs a full turn, the speed of the pump may increase/decrease by 100 percent.

Additionally, the process variable may increase or decrease based on and/or in proportion to an amount of time for the rotation. The process variable may continue to increase or decrease the longer the operator holds the rotated position. For example, when the operator rotates his fingers to the left and holds down for 10 seconds, the speed of the pump may increase by 10 percent, and when the operator holds down for 10 more seconds, the speed of the pump may increase by 20 percent. In other embodiments, the process variable may change based on and/or in proportion to a combination of the amount of rotation and the amount of time for the rotation. For example, the rate of change for a process variable may be based on and/or in proportion to the amount of rotation for the rotate gesture. In this manner, if the operator performs a quarter turn to the left, for example, the rate of change for the process variable may be 10 percent per second. When the operator holds his fingers down after performing the quarter turn for 1 second, the process variable may increase by 10 percent, when he holds his fingers down for 2 seconds, the process variable may increase by 20 percent, etc. Then when the operator rotates his fingers another quarter turn to the left so he has rotated a half turn from the initial position, the rate of change for the process variable may be 20 percent per second, for example.

The operator may also perform pinch and spread gestures 314, 316 which may be used to imitate the closing and opening of a valve, respectively, for example. The valve opening percentage may be adjusted based on the amount the operator pinches or spreads her fingers. In some embodiments, the process variable value may increase or decrease in proportion to the amount the operator pinches or spreads her fingers. For example, if the operator pinches her fingers together by more than a threshold amount and/or for a threshold length of time, the valve may close completely corresponding to a valve opening percentage of 0. In another example, if the operator spreads her fingers from 1 cm apart to 3 cm apart, the valve opening percentage may increase by 20 percent, and if the operator continues to spread her fingers such that they are 10 cm apart, the valve may open completely corresponding to a valve opening percentage of 100.

In some embodiments, the process variable may change based on and/or in proportion to an amount of time for the pinch or spread gesture 314, 316. The process variable may continue to increase or decrease the longer the operator holds the pinch or spread position. For example, when the operator pinches her fingers so that they are 1 cm closer together and holds down for 10 seconds, the valve opening percentage may decrease by 10 percent, and when the operator holds down for 10 more seconds, the valve opening percentage may decrease by 20 percent. In other embodiments, the process variable may change based on and/or in proportion to a combination of the amount the operator pinches or spreads her fingers and the amount of time for the pinch or spread gesture. For example, the rate of change for a process variable may be based on and/or in proportion to the amount the operator pinches or spreads her fingers. In this manner, if the operator spreads her fingers from 1 cm apart to 3 cm apart, for example, the rate of change for the process variable may be 10 percent per second. When the operator holds her fingers down after performing the spread gesture for 1 second, the process variable may increase by 10 percent, when she holds her fingers down for 2 seconds, the process variable may increase by 20 percent, etc. Then when the operator spreads her fingers 2 more cm apart so they are 4 cm apart from the initial position, the rate of change for the process variable may be 20 percent per second, for example.

In some embodiments, the operator may perform a slide gesture 318 to move from one portion of the process plant to another portion of the process plant on the UI device 112. For example, if the UI device 112 presents the screen display 200 as shown in FIG. 2, the operator may slide her finger to the right to view a portion of the process plant which is adjacent to and on the right side of the portion of the process plant shown in the screen display 200. In another example, the operator may perform the slide gesture 318 to close a window open on the UI device 112. In this example, the operator may have several windows open each depicting a different portion of the process plant and the operator may slide her finger down to remove the window at the front of the display.

In some embodiments, physical buttons may be provided to the operator on the UI device 112 for the operator to lock or unlock a process variable, as described in more detail below with reference to FIGS. 5A-D. As mentioned above, the operator may perform a press gesture 310 to lock or unlock the process variable. The physical buttons may appear on the UI device 112 in response to the operator performing a double tap gesture 320. The operator may tap one finger twice in succession anywhere on the UI device 112 to request the physical buttons. In other embodiments, the physical buttons may be configured as a permanent part of the display.

The operator may also perform an arcuate gesture 322, which may be a single or multi-touch gesture, where the operator uses a curved motion to create an outline of a circle or a portion of a circle with his finger. The operator may use the arcuate gesture 322 to adjust the speed of a pump, to adjust the temperature setting for a heat exchange, etc. For example, if the operator moves his finger clockwise in a curved motion, the speed of the pump may increase and if he moves his finger counterclockwise in a curved motion, the speed of the pump may decrease. The speed of the pump may increase or decrease based on the length of the curve, amount of rotation, radius of the corresponding circle or portion of a circle, etc. In some embodiments, the process variable value may increase or decrease in proportion to the length of the curve, amount of rotation, radius of the corresponding circle or portion of a circle, etc. For example, if the operator creates a quarter circle based on the motion of his finger, the speed of the pump may increase/decrease by 25 percent, if the operator creates a semi-circle based on the motion of his finger, the speed of the pump may increase/decrease by 50 percent, and if the operator creates a full circle based on the motion of his finger, the speed of the pump may increase/decrease by 100 percent.

Additionally, the process variable may increase or decrease based on and//or in proportion to an amount of time in which the operator holds the arcuate gesture. The process variable may continue to increase or decrease the longer the operator holds the arcuate position. For example, when the operator moves his finger counterclockwise in a curved motion and holds down for 10 seconds, the speed of the pump may increase by 10 percent, and when the operator holds down for 10 more seconds, the speed of the pump may increase by 20 percent. In other embodiments, the process variable may change based on and/or in proportion to a combination of the length of the curve, amount of rotation, radius of the corresponding circle or portion of a circle, and the amount of time in which the operator holds the arcuate gesture. For example, the rate of change for a process variable may be based on and/or in proportion to the amount of rotation for the arcuate gesture. In this manner, if the operator creates a quarter circle using a counterclockwise motion, for example, the rate of change for the process variable may be 10 percent per second. When the operator holds his finger down after creating the quarter circle for 1 second, the process variable may increase by 10 percent, when he holds his finger down for 2 seconds, the process variable may increase by 20 percent, etc. Then when the operator continues to move his finger counterclockwise so he has created a semi-circle from the initial position, the rate of change for the process variable may be 20 percent per second, for example.

While these examples illustrate the process variables increasing or decreasing in a linear manner based on and/or in proportion to the length of the gesture, the time for the gesture, the amount of rotation for the gesture, or a combination of these, this is merely an example embodiment. In other embodiments, the process variables may increase or decrease logarithmically, exponentially, quadratically, polynomially, according to a step-wise function, or in any other suitable manner, based on and/or in proportion to the length of the gestures, the time for the gestures, the amount of rotation for the gestures, or a combination of these.

Moreover, while FIG. 3 includes eleven gestures 302-322 which may be used by an operator to control operation of process plant entities within a process plant 10, these are merely a few exemplary gestures which may be used by an operator. Additional and or alternative gestures may also be included. Also, while each of the gestures 302-322 are described above with reference to a particular process variable, the gestures 302-322 may be associated with any process variable and/or process plant entity in the process plant. For example, the pinch gesture 314 may be used to adjust the speed of a pump, the flick gesture 304 may be used to adjust a valve opening percentage, etc.

In some embodiments, the operator does not need to make physical contact with the UI device 112 and instead may point her finger(s) at the location corresponding to the process plant entity and perform one of the gestures 302-322. One or more cameras within the UI device 112 may detect the position of the operator's finger(s) in relation to the UI device 112 to identify the process plant entity corresponding to the process variable which the operator would like to adjust.

When a process variable is adjusted on the UI device 112, the adjusted value for the process variable may be displayed as a set point value, which is a desired value for the process variable within the on-line process plant. The set point value may be transmitted to the controllers 11 to adjust the process variable in the on-line process plant to the set point value. The process variable value shown on the UI device 112 via for example, the screen display 200, may be the actual measurement within the on-line process plant for the process variable while the process variable is adjusted by the controllers 11 to the set point value. In some embodiments, a set point value may not be transmitted to the controllers 11 for adjusted the process variable until the operator completes the gesture (e.g., by taking her finger off of the UI device 112). In this manner, the operator may decrease or increase the amount of the adjustment before it takes effect within the on-line process plant. The operator may also perform a tap gesture 306 or other gesture after completing the gesture to indicate that the adjustment should take effect within the on-line process plant. The set point value may then be transmitted to the controllers 11 upon receiving the tap gesture 306. Also, in some embodiments, an operator or operators may perform multiple gestures simultaneously (a multi-gesture), to adjust several process variable values at the same time.

Figure 4A:
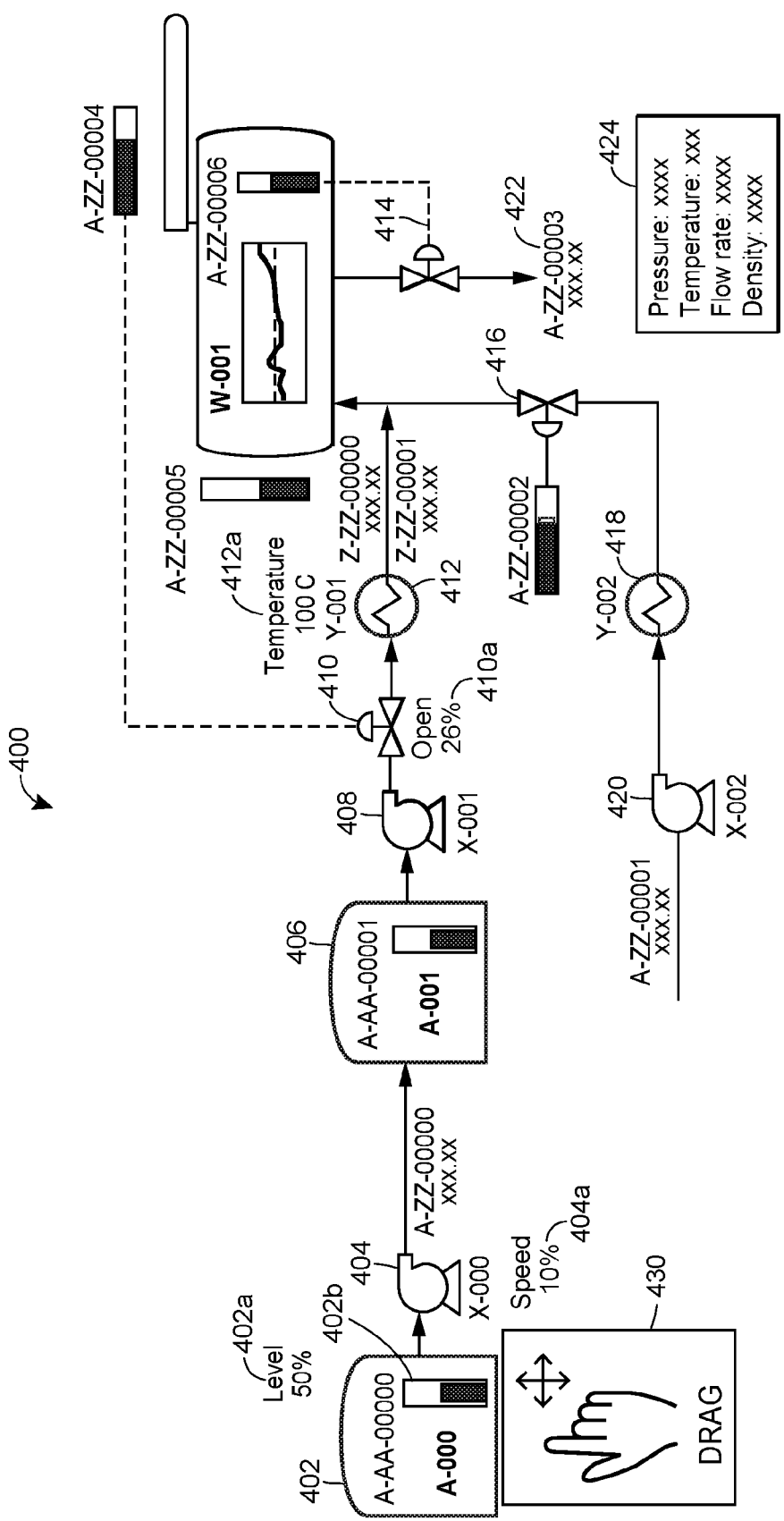
FIGS. 4A-G are screen displays which are adjusted according to gesture-based input from an operator.
Figure 4B:
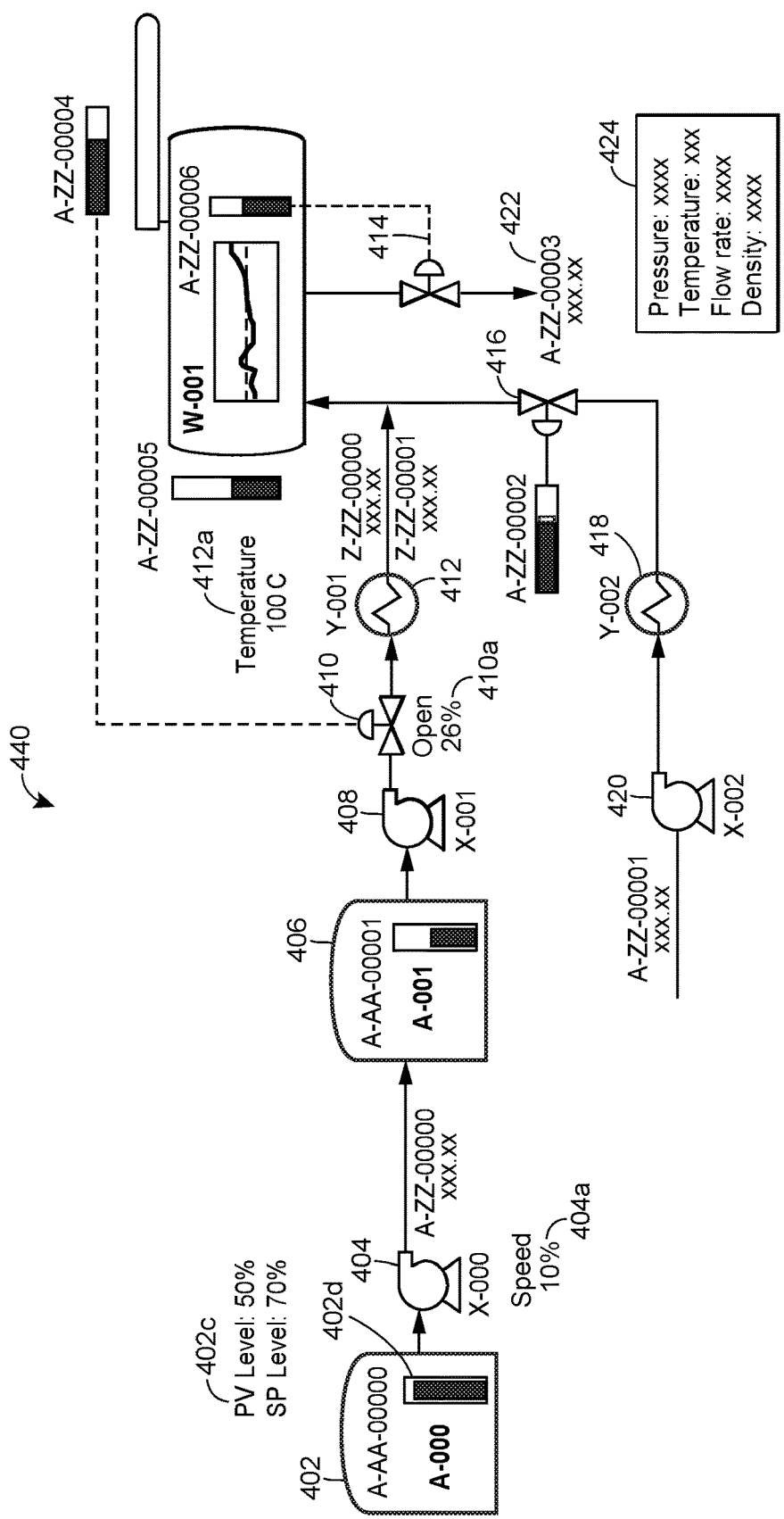
Figure 4C:
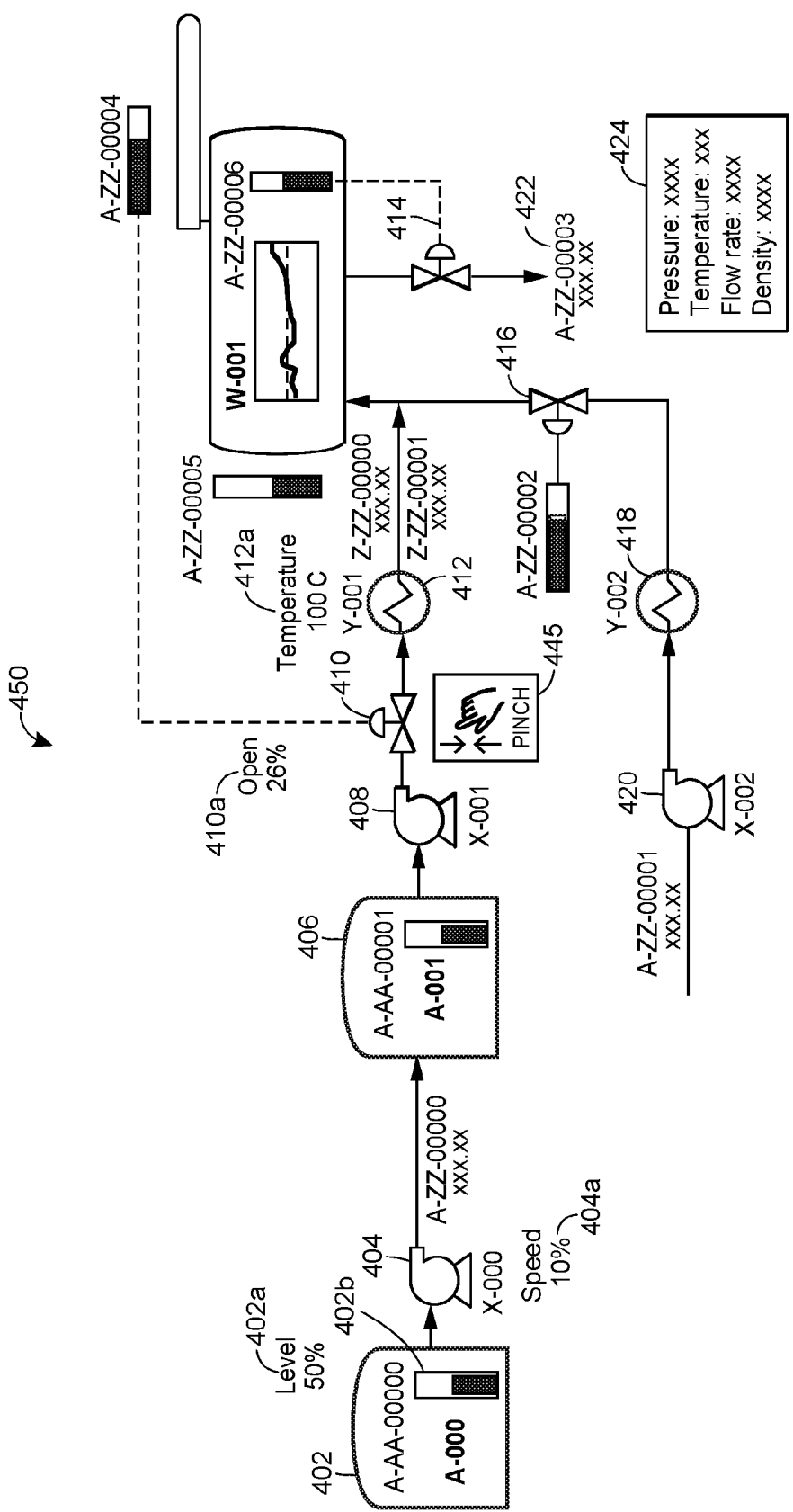
Figure 4D:
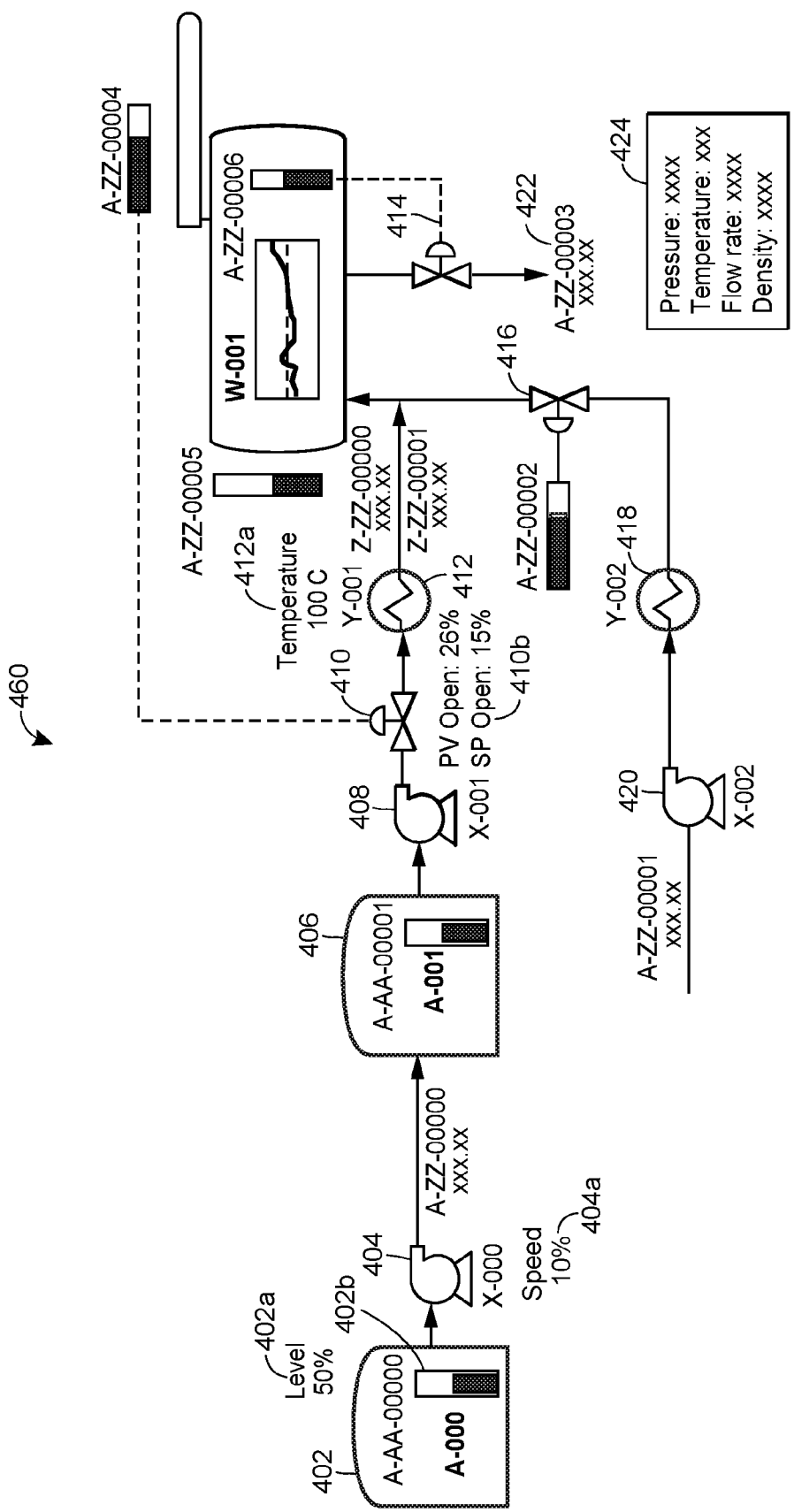
Figure 4E:
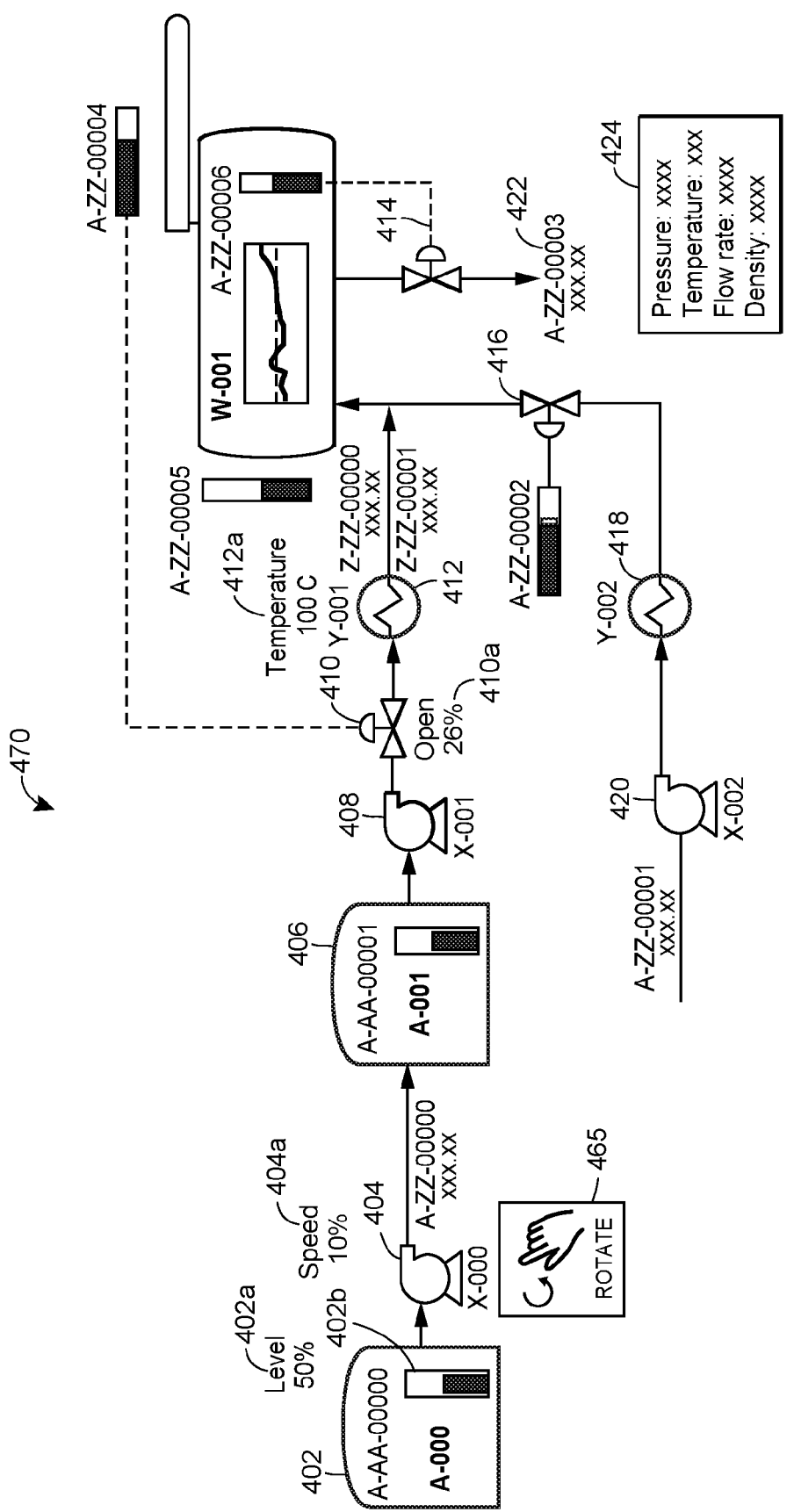
Figure 4F:
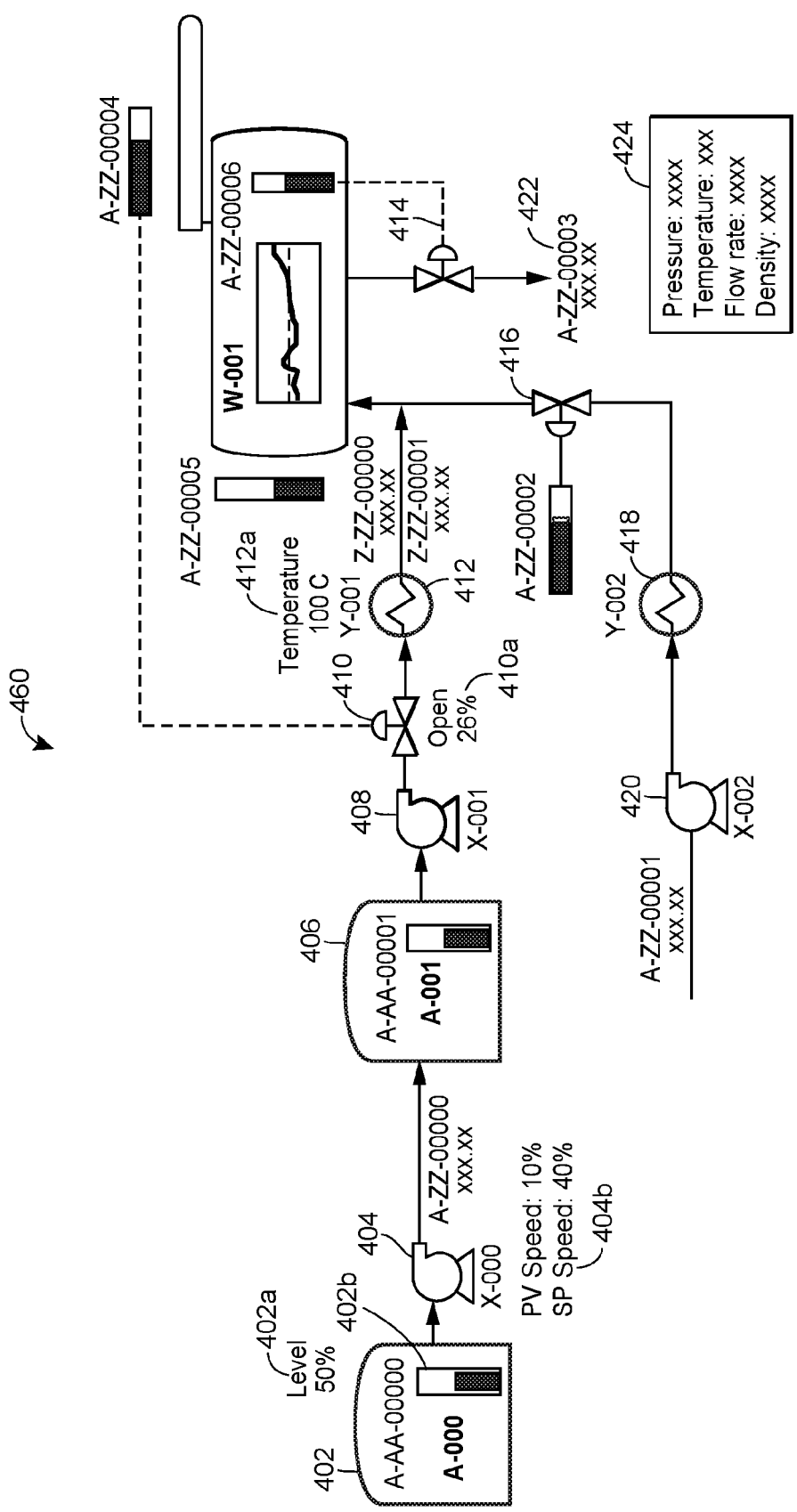
Figure 4G:
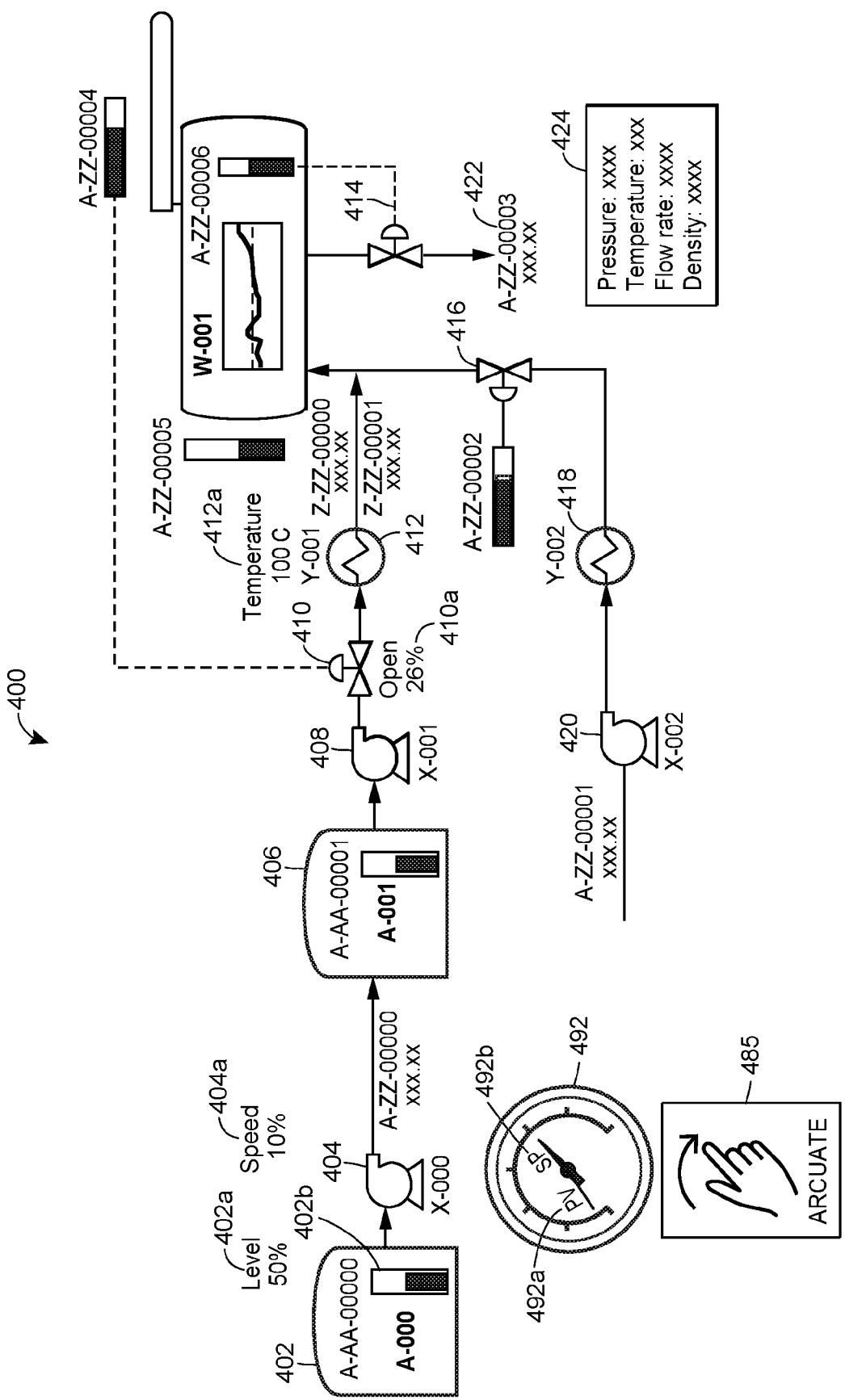

FIGS. 4A-G illustrate example screen displays which may be presented on the display 84 of the UI device 112 and which are adjusted according to gesture-based input from an operator. More specifically, FIGS. 4A-B illustrate a screen display which is adjusted according to a slide gesture by the operator, FIGS. 4C-D illustrate a screen display which is adjusted according to a pinch gesture by the operator, FIGS. 4E-F illustrate a screen display which is adjusted according to a rotate gesture by the operator, and FIG. 4G illustrates a screen display which is adjusted according to an arcuate gesture by the operator.

While FIGS. 4A-G illustrate a drag gesture, a pinch gesture, a rotate gesture, and an arcuate gesture, these are merely a few exemplary gestures which may be used by an operator to adjust process variables in the process plant. Additional or alternative gestures may also be utilized including any of the gestures described in FIG. 3. Also, while each of the gestures is described in association with a particular type of adjustment to a particular process variable such as an increase in the tank level value, the gestures may be used in any suitable manner to adjust any suitable process variable. For example, while the drag gesture is described in association with a tank for adjusting the tank level value, the drag gesture may be utilized to adjust process variables in a pump, mixer, valve, heat exchanger, or any suitable process plant entity.

Similar to the screen display 200 as shown in FIG. 2, the screen display 400 in FIG. 4A includes several process plant entities: two tanks 402, 406, three pumps 404, 408, 420, three valves 410, 414, 416, two heat exchangers 412, 418, and an output 422. Moreover, the screen display 400 includes process variable values associated with the different process plant entities, such as a tank level value 402*a* associated with the tank 402, a pump speed 404*a* associated with the pump 404, a valve opening percentage 410*a* associated with the valve 410, a temperature 412*a* associated with the heat exchanger 412, and a pressure, temperature, flow rate, and density 424 of the output 422. The screen display 400 further includes graphic representations of the process variable values associated with the different process plant entities, such as a graphic representation of the tank level value 402*b* associated with the tank 402.

Each of the process plant entities may be associated with one or several gestures, such as the gestures described in FIG. 3. Each gesture associated with a particular process plant entity may correspond to an adjustment to one of the process plant variables for the particular process plant entity. For example, a tank may be associated with a drag gesture which corresponds to an increase or decrease in the tank level value based on the direction of the drag and may be associated with a flick gesture which corresponds to a faster increase or decrease in the tank level value based on the direction of the flick. In another example, the tank may be associated with a rotate gesture or an arcuate gesture which corresponds to an increase or decrease in the tank level value based on the direction of the rotation. In yet another example, a valve may be associated with a pinch gesture and a spread gesture which correspond to an increase and a decrease in the valve opening percentage, respectively. The valve may also be associated with a slide gesture which corresponds to an increase or decrease in the valve opening percentage based on the direction of the slide. These associations may be stored in the memory of the UI device 112 and/or the server 150. In this manner, when an operator performs a gesture at a location corresponding to one of the process plant entities on the display screen 400, the UI device 112 and/or the server 150 may identify a corresponding action to take in response to the gesture.

More specifically, in response to the operator performing a drag gesture 430 beginning at a location on the screen display 400 corresponding to the graphic representation of the tank 402, the tank level value may be adjusted in accordance with the direction and length of the drag gesture.

For example, if the operator drags his finger upwards or to the right the tank level value may increase, and if the operator drags his finger downwards or to the left the tank level value may decrease. The further the operator drags his finger upwards or to the right from a starting position on the screen display 400, the more the tank level value increases, such that for example, a 1 cm drag gesture may correspond to a 10 percent increase in the tank level value and a 2 cm drag gesture may correspond to a 20 percent increase in the tank level value. Moreover, the further the operator drags his finger downwards or to the left from the starting position on the screen display 400, the more the tank level value decreases. In one embodiment, the tank level value may also be adjusted in accordance with the speed of the drag gesture. For example, the faster the operator drags his finger upwards or to the right from the starting position on the screen display 400, the more the tank level value increases.

Additionally, the tank level value may increase or decrease based on and/or in proportion to an amount of time for the drag. The tank level value may continue to increase or decrease the longer the operator holds the dragged position. For example, when the operator drags her finger upward and holds down for 10 seconds, the tank level value may increase by 10 percent, and when the operator holds down for 10 more seconds, the tank level value may increase by 20 percent. In other embodiments, the tank level value may change based on and/or in proportion to a combination of the length of the drag gesture and the amount of time for the drag gesture. For example, the rate of change for a tank level value may be based on and/or in proportion to the distance of the drag gesture. In this manner, if the operator drags her finger 1 cm upward, for example, the rate of change for the tank level value may be 10 percent per second. When the operator holds her finger down after dragging 1 cm upward for 1 second, the tank level value may increase by 10 percent, when she holds her finger down for 2 seconds, the tank level value may increase by 20 percent, etc. Then when the operator drags her finger another cm upward so she has dragged her finger 2 cm upward from the initial position, the rate of change for the tank level value may be 20 percent per second, for example.

In some embodiments, when the operator adjusts the tank level value via the drag gesture 430, the tank level value 402*a* and the graphic representation of the tank level value 402*b* on the screen display 400 may adjust accordingly. In other embodiments, a set point value for the tank 402 may be adjusted on the screen display 400 while the tank level value 402*a* and the graphic representation of the tank level value 402*b* may continue to reflect the actual measurement of the tank level from the on-line process plant, while the controllers 11 adjust the tank level in the on-line process plant from the original value of 50 percent 402*a* to a new value set by the operator.

FIG. 4B illustrates an example screen display 440 after the tank level is adjusted in response to the operator's drag gesture. The screen display 440 may include indications 402*c* of the process variable (PV) value for the tank level (50%) and the set point (SP) value for the tank level (70%). Additionally, the graphic representation of the tank level value 402*d* may display an increased tank level compared to the tank level value 402*b* in the screen display 400 as shown in FIG. 4A.

When the tank level or any other process variable in the process plant is adjusted via the UI device 112, the UI device 112 and more specifically the control unit 44, may communicate with the controllers 11 to adjust the process variable in the on-line process plant. For example, when the set point value for the tank level is adjusted by the operator from 50 to 70 percent, the UI device 112 may transmit a communication to the controllers 11 to adjust the tank level to 70 percent, and the controllers 11 may in turn, generate and transmit control signals to the field devices 14, 16 to increase the tank level in the tank 402 to 70 percent.

FIG. 4C illustrates an example screen display 450 similar to the screen display 400 as shown in FIG. 4A, where the operator performs a pinch gesture 445 at a location on the screen display 450 corresponding to a graphic representation of a valve 410. The screen display 450 indicates that the valve opening percentage before the pinch gesture is 26 percent 410a. In response to the operator performing the pinch gesture 445 beginning at a location on the screen display 450 corresponding to the graphic representation of the valve 410, the valve opening percentage may decrease in accordance with the amount the operator pinches her fingers together. For example, if the operator pinches her fingers 2 cm inwards, the valve opening percentage may decrease by 25 percent, and if she pinches her fingers 3 cm inwards, the valve opening percentage may decrease by 40 percent. To increase the valve opening percentage, the operator may perform a spread gesture and in turn, the valve opening percentage may increase in accordance with the amount the operator spreads her fingers apart. For example, if the operator spreads her fingers 2 cm apart, the valve opening percentage may increase by 25 percent, and if she spreads her fingers 3 cm apart, the valve opening percentage may increase by 40 percent.

In some embodiments, the valve opening percentage may change based on and/or in proportion to an amount of time for the pinch gesture 445. The valve opening percentage may continue to increase or decrease the longer the operator holds the pinch position. For example, when the operator pinches her fingers so that they are 1 cm closer together and holds down for 10 seconds, the valve opening percentage may decrease by 10 percent, and when the operator holds down for 10 more seconds, the valve opening percentage may decrease by 20 percent. In other embodiments, the valve opening percentage may change based on and/or in proportion to a combination of the amount the operator pinches her fingers and the amount of time for the pinch gesture 445. For example, the rate of change for the valve opening percentage may be based on and/or in proportion to the amount the operator pinches her fingers. In this manner, if the operator pinches her fingers 1 cm inwards, for example, the rate of change for the valve opening percentage may be 10 percent per second. When the operator holds her fingers down after performing the pinch gesture for 1 second, the valve opening percentage may increase by 10 percent, when she holds her fingers down for 2 seconds, the valve opening percentage may increase by 20 percent, etc. Then when the operator pinches her fingers 1 more cm inwards so they are 2 cm inwards from the initial position, the rate of change for the valve opening percentage may be 20 percent per second, for example.

In some embodiments, when the operator adjusts the valve opening via the pinch gesture 445 or the spread gesture, the valve opening percentage 410a on the screen display 450 may adjust accordingly. In other embodiments, a set point value for the valve 410 may be adjusted on the screen display 450 while the valve opening percentage 410a may continue to reflect the actual measurement of the valve opening percentage from the on-line process plant, while the controllers 11 adjust the valve opening in the on-line process plant from the original value of 26 percent 410a to a new value set by the operator.

FIG. 4D illustrates an example screen display 460 after the valve opening is adjusted in response to the operator's pinch gesture. The screen display 460 may include indications 410b of the process variable (PV) value for the valve opening (26%) and the set point (SP) value for the valve opening (15%).

When the valve opening or any other process variable in the process plant is adjusted via the UI device 112, the UI device 112 and more specifically the control unit 44, may communicate with the controllers 11 to adjust the process variable in the on-line process plant. For example, when the set point value for the valve opening is adjusted by the operator from 26 to 15 percent, the UI device 112 may transmit a communication to the controllers 11 to adjust the valve opening to 15 percent, and the controllers 11 may in turn, generate and transmit control signals to the field devices 14, 16 to decrease the valve opening in the valve 410 to 15 percent.

FIG. 4E illustrates an example screen display 470 similar to the screen display 400 as shown in FIG. 4A, where the operator performs a rotate gesture 465 at a location on the screen display 470 corresponding to a graphic representation of a pump 404. The screen display 470 indicates that the speed of the pump before the rotate gesture is 10 percent 404a of the maximum pump speed. In response to the operator performing the rotate gesture 465 beginning at a location on the screen display 470 corresponding to the graphic representation of the pump 404, the pump speed may be adjusted in accordance with the direction and amount of the rotate gesture. For example, if the operator rotates his fingers clockwise or to the right the pump speed may increase, and if the operator rotates his fingers counterclockwise or to the left the pump speed may decrease. The further the operator rotates his fingers clockwise or to the right from a starting position on the screen display 470, the more the pump speed increases, such that for example, a 45 degree clockwise rotation may correspond to a 15 percent increase in the pump speed and a 90 degree clockwise rotation may correspond to a 25 percent increase in the pump speed. Moreover, the further the operator rotates his fingers counterclockwise or to the left from the starting position on the screen display 470, the more the pump speed decreases.

Additionally, the pump speed may increase or decrease based on and/or in proportion to an amount of time for the rotation. The pump speed may continue to increase or decrease the longer the operator holds the rotated position. For example, when the operator rotates his fingers to the left and holds down for 10 seconds, the speed of the pump may increase by 10 percent, and when the operator holds down for 10 more seconds, the speed of the pump may increase by 20 percent. In other embodiments, the pump speed may change based on and/or in proportion to a combination of the amount of rotation and the amount of time for the rotation. For example, the rate of change for the pump speed may be based on and/or in proportion to the amount of rotation for the rotate gesture. In this manner, if the operator performs a quarter turn to the left, for example, the rate of change for the pump speed may be 10 percent per second. When the operator holds his fingers down after performing the quarter turn for 1 second, the pump speed may decrease by 10 percent, when he holds his fingers down for 2 seconds, the pump speed may decrease by 20 percent, etc. Then when the operator rotates his fingers another quarter turn to the left so he has rotated a half turn from the initial position, the rate of change for the pump speed may be 20 percent per second, for example.

In some embodiments, when the operator adjusts the pump speed via the rotate gesture 465, the pump speed percentage 404a on the screen display 470 may adjust accordingly. In other embodiments, a set point value for the pump 404 may be adjusted on the screen display 470 while the pump speed percentage 404a may continue to reflect the actual measurement of the pump speed percentage from the on-line process plant, while the controllers 11 adjust the pump in the on-line process plant from the original value of 10 percent 404a to a new value set by the operator.

FIG. 4F illustrates an example screen display 480 after the pump speed is adjusted in response to the operator's rotate gesture. The screen display 480 may include indications 404b of the process variable (PV) value for the pump speed (10%) and the set point (SP) value for the pump speed (40%).

When the pump speed or any other process variable in the process plant is adjusted via the UI device 112, the UI device 112 and more specifically the control unit 44, may communicate with the controllers 11 to adjust the process variable in the on-line process plant. For example, when the set point value for the pump speed is adjusted by the operator from 10 to 40 percent, the UI device 112 may transmit a communication to the controllers 11 to adjust the pump speed to 40 percent, and the controllers 11 may in turn, generate and transmit control signals to the field devices 14, 16 to increase the pump speed in the pump 404 to 40 percent.

FIG. 4G illustrates an example screen display 490 similar to the screen display 400 as shown in FIG. 4A and including a graphic representation of a dial 492 for adjusting the speed of a pump 404. As mentioned above, in response to a tap gesture 306 as shown in FIG. 3 or any other suitable gesture, a scale of values for adjusting a process variable value may be displayed. The scale of values may be displayed by the dial 492, which may include a graphic representation of a needle 492a for displaying a process variable (PV) value for the corresponding process variable and a graphic representation of another needle 492b for displaying a set point (SP) value for the corresponding process variable. The dial 492 may also display the scale of values for adjusting the process variable value.

In any event, the operator may perform an arcuate gesture 485 at a location on the screen display 490 corresponding to a graphic representation of the pump 404 or of the dial 492. The dial 492 includes an indication of a PV value 492a for the pump speed which is 10 percent 404a of the maximum pump speed. In response to the operator performing the arcuate gesture 485 beginning at a location on the screen display 490 corresponding to the graphic representation of the pump 404 or of the dial 492, the pump speed may be adjusted in accordance with the direction and amount of the arcuate gesture. The pump speed may also be adjusted in accordance with the length of the curve for the arcuate gesture, amount of rotation, radius of the corresponding circle or portion of a circle created by the arcuate gesture, etc. For example, if the operator moves her finger clockwise in a curved motion, the pump speed may increase, and if the operator moves her finger counterclockwise in a curved motion, the pump speed may decrease. The further the operator moves her finger clockwise from a starting position on the screen display 490, the more the pump speed increases, such that for example, creating a quarter circle may correspond to a 15 percent increase in the pump speed and creating a semi-circle may correspond to a 25 percent increase in the pump speed. Moreover, the further the operator moves her fingers counterclockwise in a curved motion from the starting position on the screen display 490, the more the pump speed decreases.

Additionally, the pump speed may increase or decrease based on and/or in proportion to an amount of time for the arcuate gesture. The pump speed may continue to increase or decrease the longer the operator holds the arcuate gesture position. For example, when the operator moves her finger counterclockwise and holds down for 10 seconds, the speed of the pump may increase by 10 percent, and when the operator holds down for 10 more seconds, the speed of the pump may increase by 20 percent. In other embodiments, the pump speed may change based on and/or in proportion to a combination of the length of the curve, amount of rotation, radius of the corresponding circle, and the amount of time for the arcuate gesture. For example, the rate of change for the pump speed may be based on and/or in proportion to the amount of rotation for the arcuate gesture. In this manner, if the operator creates a quarter circle using a counterclockwise motion, for example, the rate of change for the pump speed may be 10 percent per second. When the operator holds her finger down after creating the quarter circle for 1 second, the pump speed may decrease by 10 percent, when she holds her finger down for 2 seconds, the pump speed may decrease by 20 percent, etc. Then when the operator continues to move her finger counterclockwise so she has created a semi-circle from the initial position, the rate of change for the pump speed may be 20 percent per second, for example.

In some embodiments, when the operator adjusts the pump speed via the arcuate gesture 485, the SP value 492b on the dial 490 may adjust accordingly, while the PV value 492a on the dial 490 may continue to reflect the actual measurement of the pump speed percentage from the on-line process plant, while the controllers 11 adjust the pump in the on-line process plant from the original value of 10 percent 492a to a new value set by the operator.

In some embodiments, the operator may adjust the pressure, temperature, flow rate, and/or density 424 associated with the output 422 by performing one of the gestures at a location corresponding to the output 422. For example, the operator may perform a rotate gesture to adjust the pressure, a slide gesture to adjust the temperature, a pinch gesture to adjust the flow rate, and a tap gesture to adjust the density. In response, the temperature, pressure, flow rate, and/or density 424 may adjust accordingly on the screen display 480 or a set point value for the temperature, pressure, flow rate, and/or density may be adjusted and displayed on the screen display 480 while the temperature, pressure, flow rate, and/or density 424 continues to reflect the actual measurements of the temperature, pressure, flow rate, and/or density of the output 422 from the on-line process plant.

Additionally, the UI device 112 may transmit a communication to the controllers 11 to adjust the temperature, pressure, flow rate, and/or density of the output 422, and the controllers 11 may in turn, generate and transmit control signals to the field devices 14, 16 to adjust the temperature, pressure, flow rate, and/or density of the output 422. As a result, the controllers 11 may transmit control signals to increase the pump speed in the pump 404, decrease the temperature in the heat exchanger 412, or adjust any other process variable for the process plant entities in the process plant to achieve the desired temperature, pressure, flow rate, and/or density for the output 422. The adjusted process variable values may be displayed on the screen display 480 of the UI device 112.

Also in some embodiments, the UI device 112 may provide feedback to the operator to provide an indication of the amount of work required by the corresponding process plant entity or portion of the process plant to attain the adjusted process variable value. Feedback may also be provided when an adjustment to the process variable may lead to a dangerous or abnormal condition in the process plant. The feedback may be haptic feedback, such that the UI device 112 vibrates via the vibration motor 94 as shown in FIG. 1, in response to an adjustment by the operator. The amount of haptic feedback or vibration may increase as the amount of the adjustment increases and/or as the rate of change of the adjustment increases. In this manner, the operator may be met with resistance when making large changes to the operation of the process plant. In some embodiments, when an adjustment to a process variable causes the process variable value to be above or below a threshold process variable value, the UI device 112 may provide haptic feedback to the operator.

For example, if the pump speed for a pump is initially 20 percent and the operator performs a rotate gesture to increase the pump speed above 50 percent, the UI device 112 may provide haptic feedback to the operator as the set point for the pump speed approaches 50 percent. The amount of haptic feedback may increase for each percentage point above 50 percent for the pump speed, such that the frequency of the haptic feedback is 10 Hz when the set point value for the pump speed is 50 percent and 50 Hz when the set point value for the pump speed is 80 percent.

While FIGS. 4A-4G depict example screen displays 400, 440, 450, 460, 470, 480, 490 which respond to a drag gesture 430, pinch gesture 445, rotate gesture 465, and an arcuate gesture 485 these are merely example gestures to which the UI device 112 may respond. However, the UI device 112 may respond to any suitable number and type of gestures including drag gestures, flick gestures, tap gestures, etc. to control operation of the on-line process plant. Additionally, while FIGS. 4A, 4C, 4E, and 4G illustrate the operator performing one gesture at a time, the UI device 112 may receive multiple gestures simultaneously from the operator and/or from multiple operators. For example, the operator may perform a drag gesture 430 to increase the tank level for the tank 402 with her left hand while performing a rotate gesture 465 to increase the pump speed for the pump 404 with her right hand. Additionally, at the same time another operator may perform a pinch gesture 445 to close the valve 410, so that the tank level increases, the pump speed decreases, and the valve closes, simultaneously.

Furthermore, while FIGS. 4A-4G illustrate the process variables increasing or decreasing in a linear manner based on and/or in proportion to the length of the gesture, the time for the gesture, the amount of rotation for the gesture, or a combination of these, this is merely an example embodiment. In other embodiments, the process variables may increase or decrease logarithmically, exponentially, quadratically, polynomially, according to a step-wise function, or in any other suitable manner, based on the length of the gestures, the time for the gestures, the amount of rotation for the gestures, or a combination of these.

Moreover, while the description of FIGS. 4A-G includes several example values, such as distances, times, percentages, these are merely for ease of illustration only. Any suitable distances, times, percentages, etc., may be associated with the various gestures described.

In some embodiments, the display 84 of the UI device 112 may include a capacitive and/or resistive touchscreen for detecting gestures. In addition or as an alternative to the capacitive or resistive touchscreen, the UI device 112 may include one or several cameras 86 for detecting the positions of operators' fingers in relation to UI device 112. In this manner, the operator does not need to make physical contact with the UI device 112 to provide gesture-based input. Instead, the operator may point his finger at a display screen 84 and the UI device 112 may identify a corresponding location on the display screen 84 at which the operator's finger is pointed. Thus, one or several operators in a control room, for example, may adjust process variables from several feet away from a UI device 112 which is the size of one of the walls of the control room.

In some scenarios, operators may want to lock process variables for a particular process plant entity so that the process variables for that process plant entity cannot be adjusted. This may be used when an operator recently adjusted a process variable and does not want the process variable value to change again while she adjusts other process variables. An operator also may lock process variables for a particular process plant entity when the operator does not want other operators to adjust the process variables or when adjustments to the process variables for that process plant entity may lead to a dangerous condition in the process plant. An operator may lock or unlock process variables for a particular process plant entity using a press gesture, for example by pressing her finger at a location on the UI device 112 corresponding to a graphic representation associated with the process plant entity. However, because the display 84 for the UI device 112 is typically a flat surface, the operator may not be able to feel when she has completed the press gesture in the same way as when working with physical buttons.

Accordingly, in some embodiments, the UI device 112 may display physical buttons in the shape of bubbles on the display in response to gesture-based input requesting the physical buttons. For example, the operator may perform a double tap gesture anywhere on the UI device 112 to request physical buttons. As a result, the physical buttons may appear on the display of the UI device 112 above the graphic representations associated with process plant entities. The operator may then perform a press gesture using one of the physical buttons and in response to the operator pressing down on one of the physical buttons, the UI device 112 may lock or unlock the corresponding process plant entity. Alternatively, the physical buttons may be configured as a permanent part of the display.

Figure 5A:
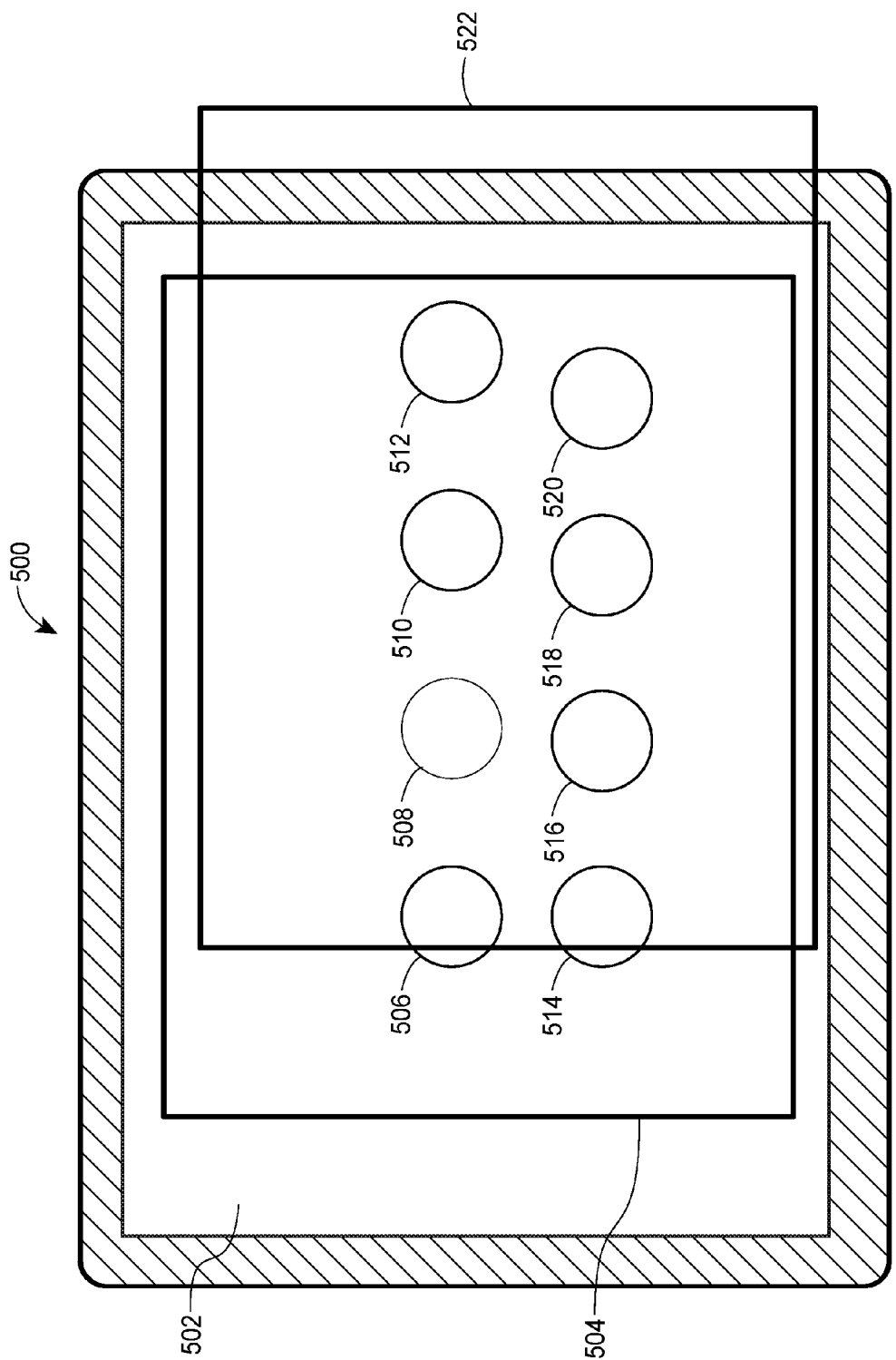
FIG. 5A is a block diagram of an user interface device having a microfluidics film for providing physical buttons to the operator.

FIG. 5A illustrates a block diagram of an example UI device 500 similar to the UI device 112 and having a microfluidics film for providing physical buttons to the operator. The display of the UI device 500 may include a flat screen 502 such as a liquid crystal display (LCD) screen. A microfluidics film 504 which contains several holes 506-520 is then placed on top of the flat screen 502 and a layer of flexible plastic 522 is placed above the microfluidics film 504. Each of the holes 506-520 is filled with a fluid and the pressure of the fluid raises the flexible plastic surface 522 to create bubbles or physical buttons on the UI device 500. In some embodiments, the shape and rigidity of the bubbles is based on the pressure of the fluid so that bubbles having higher amounts of pressure may require the operator to exert more force to press down than bubbles having a lower amount of pressure.

In response to gesture-based input requesting physical buttons (e.g., a double tap gesture), the UI device 500 may increase the pressure of the fluid in the holes which pushes up the flexible plastic surface 522 to generate the physical buttons on the display. The operator may then press on the flexible plastic surface 522 to press down on the physical buttons. When the operator no longer wants to use the physical buttons to lock or unlock process variables, the operator may provide additional gesture-based input (e.g., a double tap). As a result, the UI device 500 may cause the holes decrease the fluid pressure so that the physical buttons disappear and the flexible plastic 522 on the display returns to a flat surface.

Figure 5B:
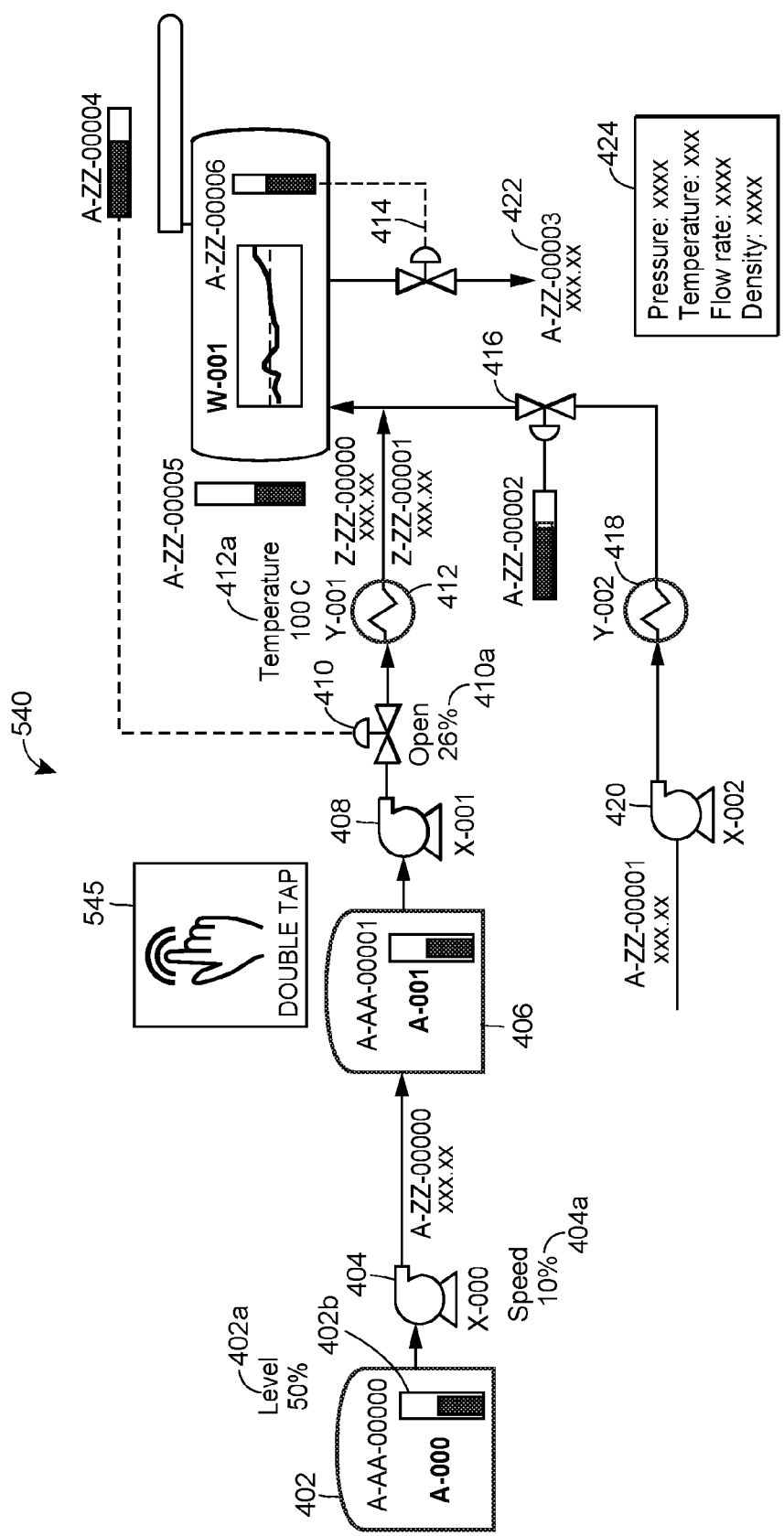
FIGS. 5B-D are screen displays for the user interface device in FIG. 5A which are adjusted according to gesture-based input from an operator.

FIG. 5B illustrates an example screen display 540 similar to the screen display 400 as shown in FIG. 4A, where the operator performs a double tap gesture 545 anywhere on the screen display 540 to request physical buttons for locking or unlocking process variables. In response to the operator performing the double tap gesture, the control unit 44 in the UI device 500 may increase the fluid pressure in the holes of the microfluidics film 504 to display the physical buttons. In some embodiments, each of the holes may be placed at locations corresponding to the graphic representations associated with the process plant entities on the UI device 500.

Figure 5C:
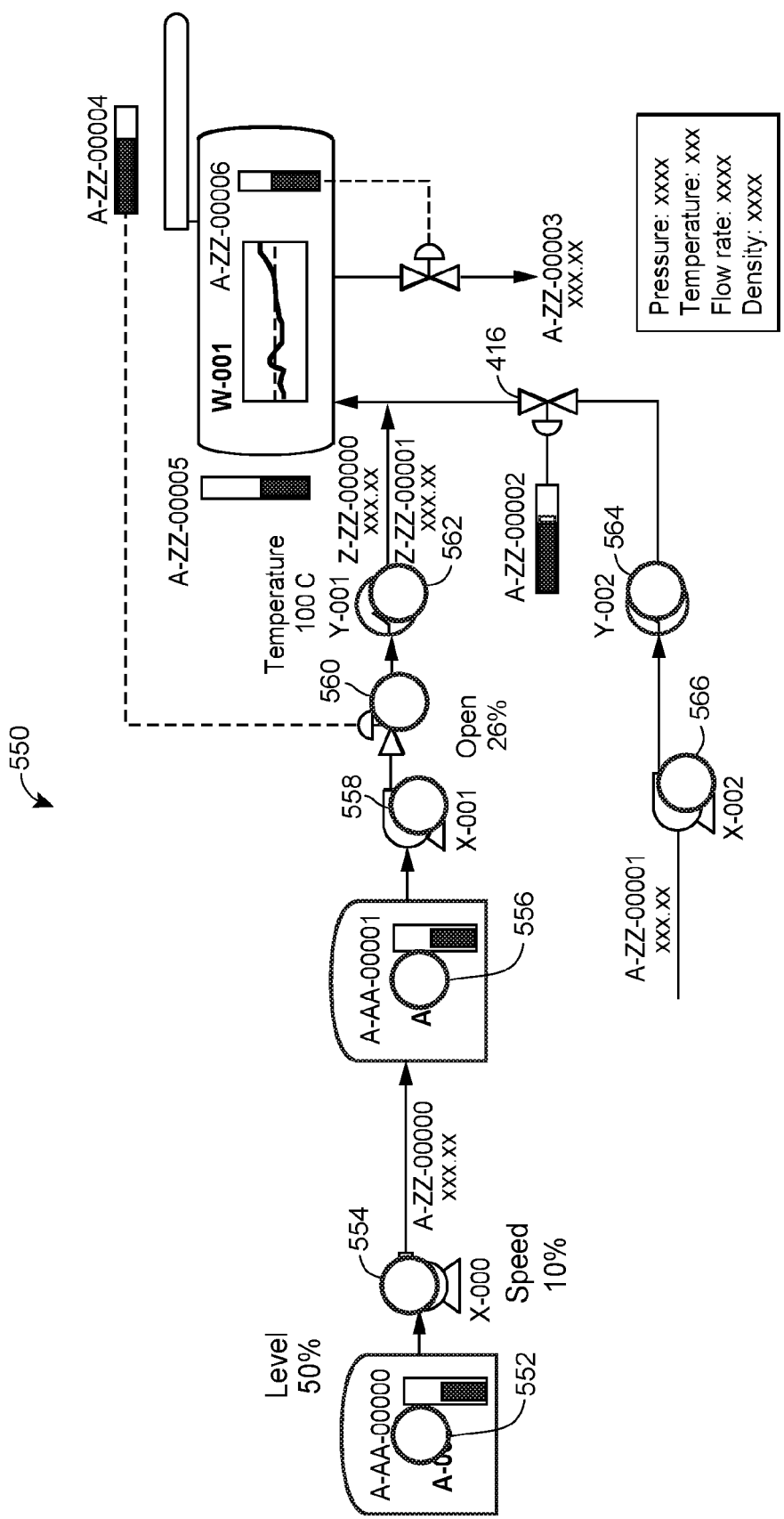

FIG. 5C illustrates an example screen display 550 after the operator requests physical buttons. Physical buttons 552-566 may appear on the screen display 550 on top of the graphic representations associated with the process plant entities. The physical buttons may be circular, rectangular, similarly shaped as the corresponding graphic representations associated with the process plant entities, or any suitable shape. Additionally, the physical buttons may be transparent, such that the graphic representations associated with the process plant entities which appear beneath the physical buttons are not obscured.

Figure 5D:
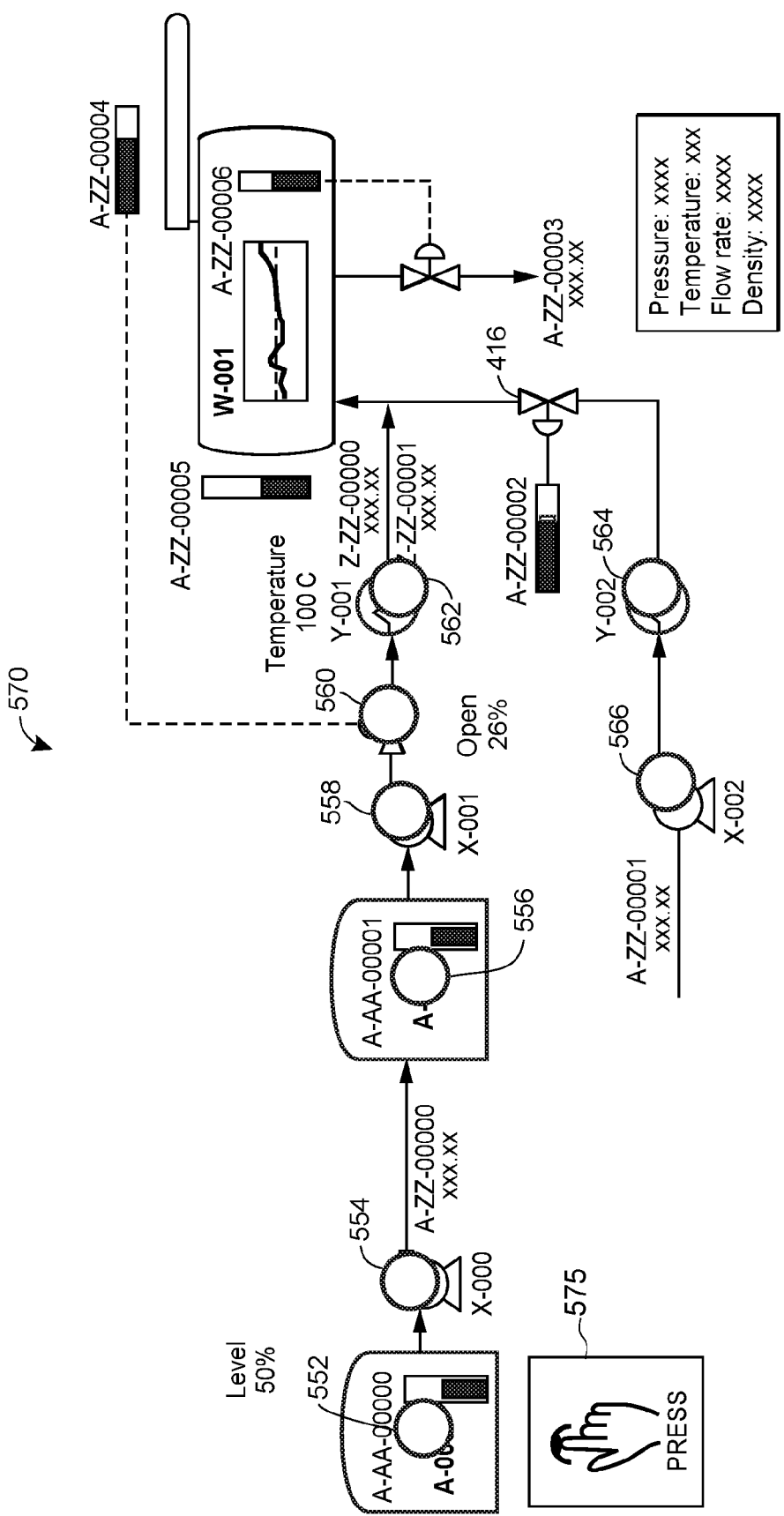

FIG. 5D illustrates an example screen display 570, where the operator performs a press gesture 575 on one of the physical buttons corresponding to the tank 404. In response to receiving the press gesture 575, the UI device 500 may lock process variables for the tank if the process variables were previously unlocked. On the other hand, if the process variables for the tank were locked, the UI device 500 may unlock the process variables in response to the press gesture 575. When the process variables are locked the operator or other operators cannot adjust the process variables for the tank using gesture-based input. In some embodiments, the operator and/or other operators may press several buttons simultaneously, locking or unlocking each of the corresponding process plant entities. To remove the physical buttons, the operator may perform another double tap gesture and the UI device 500 decreases the fluid pressure in the holes of the microfluidics film 504, which causes the display to return to a flat surface.

Embodiments of the techniques described in the present disclosure may include any number of the following aspects, either alone or combination:

1. A method for adjusting process variables in a process plant entity via a user interface device, the method comprising: presenting, by one or more processors, a process plant display including (i) a graphic representation associated with a process plant entity within a process plant and (ii) a process variable value for at least one process variable for the process plant entity as measured within the process plant; receiving, at the one or more processors, gesture-based input from a user at a location on the process plant display corresponding to the graphic representation associated with the process plant entity and indicating an adjusted process variable value for the process variable; and in response to the gesture-based input from the user: presenting, by the one or more processors, the adjusted process variable value for the process variable for the process plant entity on the process plant display; and setting, by the one or more processors, the process variable to the adjusted process variable value during on-line operation of the process plant.

2. The method according to aspect 1, wherein presenting a process plant display including a graphic representation associated with a process plant entity within a process plant and a process variable value includes presenting a plurality of graphic representations associated with a plurality of process plant entities within the process plant and a plurality of process variable values for a plurality of process variables corresponding to the plurality of process plant entities; and further comprising: receiving, by the one or more processors, multi-gesture input from the user for at least two locations on the process plant display corresponding to at least two of the plurality of graphic representations associated with the process plant entities indicating, for each of the process variables corresponding to the at least two graphic representations, an adjusted process variable value; and in response to the multi-gesture input from the user: presenting, by the one or more processors, the adjusted process variable value for each of the process variables corresponding to the at least two graphic representations on the process plant display; and setting, by the one or more processors, each of the process variables corresponding to the at least two graphic representations to the adjusted process variable value during on-line operation of the process plant.

3. The method according to any one of the preceding aspects, wherein when the process variable value is adjusted by more than a predetermined threshold amount based on the corresponding gesture-based input, the method further comprises: providing, by the one or more processors, haptic feedback to the user including vibration of the process plant display, wherein an amount of haptic feedback increases as the adjustment to the process variable value increases.

4. The method according to any one of the preceding aspects, wherein the gesture-based input does not include physical contact by the user with the process plant display and the gesture-based input is received via one or more cameras communicating with the one or more processors.

5. The method according to any one of the preceding aspects, further comprising: in response to the gesture-based input from the user, presenting, by the one or more processors, an adjusted graphic representation associated with the process plant entity corresponding to the adjusted process variable value.

6. The method according to any one of the preceding aspects, wherein the process plant entity is a tank, the process variable is a tank level, the graphic representation associated with the tank includes a graphic indication of the tank level within the tank, and when the user performs a swipe gesture corresponding to the tank level on the process plant display, the method comprises: determining, by the one or more processors, a new tank level value based on the swipe gesture; adjusting, by the one or more processors, the graphic indication of the tank level and a tank level value corresponding to the tank level on the process plant display to the new tank level value; and setting, by the one or more processors, the tank level during on-line operation of the process plant to the new tank level value.

7. The method according to any one of the preceding aspects, wherein the new tank level value is determined based on a length and speed of the swipe gesture.

8. The method according to any one of the preceding aspects, further comprising: locking, by the one or more processors, the process variable on the process plant display so that the process variable value for the process variable does not change in response to the gesture-based input.

9. The method according to any one of the preceding aspects, wherein the gesture-based input is at least one of: a tap gesture, a press gesture, a flick gesture, a drag gesture, a pinch gesture, or a spread gesture.

10. A user interface device for adjusting process variables in a process plant, the user interface device including: a display screen; one or more processors coupled to the display screen; and a non-transitory computer-readable medium coupled to the one or more processors and storing instructions thereon, that when executed by the one or more processors, cause the operative interface device to: display, via the display screen, a graphic representation associated with a process plant entity within the process plant and a process variable value for at least one process variable for the process plant entity as measured within the process plant; provide a user control overlaying the graphic representation for receiving gesture-based input from a user indicating an adjusted process variable value for the process variable; and in response to receiving the gesture-based input from the user via the user control: display, via the display screen, the adjusted process variable value in the graphic representation; and set, via a control unit, the process variable to the adjusted process variable value during on-line operation of the process plant.

11. The user interface device according to aspect 10, wherein the instructions further cause the user interface device to: display a plurality of graphic representations, each graphic representation associated with a process plant entity within the process plant and corresponding to a process variable value for at least one process variable for the process plant entity as measured within the process plant, provide a plurality of user controls, each user control overlaying the graphic representation for receiving gesture-based input from the user, wherein when the plurality of user controls receives multi-gesture input from the user for at least two locations on the user interface corresponding to at least two of the plurality of graphic representations associated with the process plant entities indicating, for each of the process variables corresponding to the at least two graphic representations, an adjusted process variable value, the instructions cause the user interface device to display the adjusted process variable value for each of the process variables corresponding to the at least two graphic representations on the process plant display and set each of the process variables corresponding to the at least two graphic representations to the adjusted process variable value during on-line operation of the process plant.

12. The user interface device according to either one of aspect 10 or of aspect 11, wherein when the process variable value is adjusted by more than a predetermined threshold amount based on the corresponding gesture-based input, the instructions causes the user interface device to provide haptic feedback to the user, wherein an amount of haptic feedback increases as the adjustment to the process variable value increases.

13. The user interface device according to any one of aspects 10-12, further comprising: one or more cameras communicatively coupled to the one or more processors; wherein the gesture-based input does not include physical contact by the user with the user interface device and the gesture-based input is received via the one or more cameras.

14. The user interface device according to any of aspects 10-13, wherein in response to the gesture-based input from the user, the instructions causes the user interface device to display an adjusted graphic representation associated with the process plant entity corresponding to the adjusted process variable value.

15. The user interface device according to any of aspects 10-14, wherein the process plant entity is a tank, the process variable is a tank level, the graphic representation associated with the tank includes a graphic indication of the tank level within the tank; and when the user performs a swipe gesture corresponding to the tank level on the process plant display, the instructions cause the user interface to: determine a new tank level value based on the swipe gesture; adjust the graphic indication of the tank level and a tank level value corresponding to the tank level to the new tank level value on the user interface; and set the tank level during on-line operation of the process plant to the new tank level value.

16. The user interface device according to any of aspects 10-15, wherein the new tank level value is determined based on a length and speed of the swipe gesture.

17. The user interface device according to any of aspects 10-16, wherein each process variable in the process plant corresponds to a set of gestures, each gesture in the set of gestures corresponding to a different adjustment to the process variable.

18. The user interface device according to any of aspects 10-17, wherein the gesture-based input is at least one of: a tap gesture, a press gesture, a flick gesture, a drag gesture, a pinch gesture, or a spread gesture.

19. A user interface device for adjusting process variables in a process plant, the display device comprising: a display screen; a microfluidics film overlaying the display screen, the microfluidics film including a plurality of holes; a flexible plastic surface overlaying the microfluidics film, wherein the plurality of holes in the microfluidics film fill with fluid to raise portions of the flexible plastic surface; one or more processors coupled to the display screen; a non-transitory computer-readable medium coupled to the one or more processors and storing instructions thereon, that when executed by the one or more processors, cause the operative interface device to: display a graphic representation associated with a process plant entity within the process plant and a process variable value for at least one process variable for the process plant entity as measured within the process plant, wherein at least one of the plurality of holes overlays the graphic representation of the process plant entity; provide a user control for receiving gesture-based input from a user indicating that the user will adjust a lock position of the process plant entity; and in response to the receiving the gesture-based input from the user via the user control: increase an amount of pressure in the fluid within the plurality of holes in the microfluidics film to raise corresponding portions of the flexible plastic surface; and adjust the lock position of the process plant entity when the user presses on one of the plurality of fluid filled holes corresponding to the graphic representation associated with the process plant entity.

20. The user interface device according to aspect 19, wherein when the user provides a gesture-based input indicating that the user is done adjusting the lock position of the process plant entity, the instructions cause the operative interface device to decrease the amount of pressure in the fluid to lower the corresponding portions of the flexible plastic surface.

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device), such as illustrated in FIG. 1B. The instructions, when executed by one or more processors of a corresponding device (e.g., a server, a user interface device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A method for adjusting process variables in a process plant entity via a user interface device, the method comprising:

presenting, by one or more processors, a process plant display including (i) a plurality of connected graphic representations associated with a plurality of process plant entities within a process plant and (ii) a process variable value for at least one process variable for a first process plant entity as measured within the process plant;

receiving, at the one or more processors, a single finger gesture-based input from a user at a location on the process plant display on a graphic representation associated with the first process plant entity and indicating an adjusted process variable value for the process variable, wherein the adjusted process variable value changes in proportion to an amount of time for the finger gesture-based input; and in response to the finger gesture-based input from the user:

presenting, by the one or more processors, the adjusted process variable value for the process variable for the first process plant entity on the process plant display; and setting, by the one or more processors, the process variable to the adjusted process variable value during on-line operation of the process plant, wherein a control module controls a field device associated with the first process plant entity to set the process variable to the adjusted process variable value.

2. The method of claim 1, further comprising:
receiving, by the one or more processors, multi-gesture input from the user for at least two locations on the process plant display corresponding to at least two of the plurality of graphic representations associated with the plurality of process plant entities indicating, for each of the process variables corresponding to the at least two graphic representations, an adjusted process variable value; and
in response to the multi-gesture input from the user:
presenting, by the one or more processors, the adjusted process variable value for each of the process variables corresponding to the at least two graphic representations on the process plant display; and
setting, by the one or more processors, each of the process variables corresponding to the at least two graphic representations to the adjusted process variable value during on-line operation of the process plant.

3. The method of claim 1, wherein when the process variable value is adjusted by more than a predetermined threshold amount based on the corresponding finger gesture-based input, the method further comprises:
providing, by the one or more processors, haptic feedback to the user including vibration of the process plant display, wherein an amount of haptic feedback increases as the adjustment to the process variable value increases.

4. The method of claim 1, wherein the finger gesture-based input does not include physical contact by the user with the process plant display and the finger gesture-based input is received via one or more cameras communicating with the one or more processors.

5. The method of claim 1, further comprising:
in response to the finger gesture-based input from the user, presenting, by the one or more processors, an adjusted graphic representation associated with the first process plant entity corresponding to the adjusted process variable value.

6. The method of claim 5, wherein the first process plant entity is a tank, the process variable is a tank level, the graphic representation associated with the tank includes a graphic indication of the tank level within the tank, and when the user performs a swipe gesture corresponding to the tank level on the process plant display, the method comprises:
determining, by the one or more processors, a new tank level value based on the swipe gesture;
adjusting, by the one or more processors, the graphic indication of the tank level and a tank level value corresponding to the tank level on the process plant display to the new tank level value; and
setting, by the one or more processors, the tank level during on-line operation of the process plant to the new tank level value.

7. The method of claim 6, wherein the new tank level value is determined based on a length and speed of the swipe gesture.

8. The method of claim 1, further comprising:
locking, by the one or more processors, the process variable on the process plant display so that the process variable value for the process variable does not change in response to the finger gesture-based input.

9. The method of claim 1, wherein the finger gesture-based input is at least one of: a tap gesture, a press gesture, a flick gesture, a drag gesture, a pinch gesture, or a spread gesture.

10. A user interface device for adjusting process variables in a process plant, the user interface device including:
a display screen;
one or more processors coupled to the display screen; and
a non-transitory computer-readable medium coupled to the one or more processors and storing instructions thereon, that when executed by the one or more processors, cause the operative interface device to:
display, via the display screen, a plurality of connected graphic representations associated with a plurality of process plant entities within the process plant and a process variable value for at least one process variable for a first process plant entity as measured within the process plant;
provide a user control overlaying a graphic representation for receiving a single finger gesture-based input from a user indicating an adjusted process variable value for the process variable, wherein the adjusted process variable value changes in proportion to an amount of time for the finger gesture-based input; and
in response to receiving the finger gesture-based input from the user via the user control:
display, via the display screen, the adjusted process variable value in the graphic representation; and
set, via a control unit, the process variable to the adjusted process variable value during on-line operation of the process plant, wherein a control module controls a field device associated with the first process plant entity to set the process variable to the adjusted process variable value.

11. The user interface device of claim 10, wherein the instructions further cause the user interface device to:
provide a plurality of user controls, each user control overlaying the graphic representation for receiving finger gesture-based input from the user,
wherein when the plurality of user controls receives multi-gesture input from the user for at least two locations on the user interface corresponding to at least two of the plurality of graphic representations associated with the plurality of process plant entities indicating, for each of the process variables corresponding to the at least two graphic representations, an adjusted process variable value, the instructions cause the user interface device to display the adjusted process variable value for each of the process variables corresponding to the at least two graphic representations on the process plant display and set each of the process variables corresponding to the at least two graphic representations to the adjusted process variable value during on-line operation of the process plant.

12. The user interface device of claim 10, wherein when the process variable value is adjusted by more than a predetermined threshold amount based on the corresponding finger gesture-based input, the instructions cause the user interface device to provide haptic feedback to the user, wherein an amount of haptic feedback increases as the adjustment to the process variable value increases.

13. The user interface device of claim 10, further comprising:
one or more cameras communicatively coupled to the one or more processors;
wherein the finger gesture-based input does not include physical contact by the user with the user interface device and the finger gesture-based input is received via the one or more cameras.

14. The user interface device of claim 10, wherein in response to the finger gesture-based input from the user, the instructions cause the user interface device to display an adjusted graphic representation associated with the first process plant entity corresponding to the adjusted process variable value.

15. The user interface device of claim 14, wherein the first process plant entity is a tank, the process variable is a tank level, the graphic representation associated with the tank includes a graphic indication of the tank level within the tank; and when the user performs a swipe gesture corresponding to the tank level on the process plant display, the instructions cause the user interface to:
  determine a new tank level value based on the swipe gesture;
  adjust the graphic indication of the tank level and a tank level value corresponding to the tank level to the new tank level value on the user interface; and
  set the tank level during on-line operation of the process plant to the new tank level value.

16. The user interface device of claim 15, wherein the new tank level value is determined based on a length and speed of the swipe gesture.

17. The user interface device of claim 10, wherein each process variable in the process plant corresponds to a set of gestures for the process variable, each gesture in the set of gestures for the process variable corresponding to a different adjustment to the process variable.

18. The user interface device of claim 10, wherein the finger gesture-based input is at least one of: a tap gesture, a press gesture, a flick gesture, a drag gesture, a pinch gesture, or a spread gesture.

19. A user interface device for adjusting process variables in a process plant, the display device comprising:
  a display screen;
  a microfluidics film overlaying the display screen, the microfluidics film including a plurality of holes;
  a flexible plastic surface overlaying the microfluidics film, wherein the plurality of holes in the microfluidics film fill with fluid to raise portions of the flexible plastic surface;
  one or more processors coupled to the display screen;
  a non-transitory computer-readable medium coupled to the one or more processors and storing instructions thereon, that when executed by the one or more processors, cause the user interface device to:
    display a graphic representation associated with a process plant entity within the process plant and a process variable value for at least one process variable for the process plant entity as measured within the process plant, wherein at least one of the plurality of holes overlays the graphical representation of the process plant entity;
    provide a user control for receiving gesture-based input from a user indicating that the user will adjust a lock position of the process plant entity; and
    in response to the receiving the gesture-based input from the user via the user control:
      increase an amount of pressure in the fluid within the plurality of holes in the microfluidics film to raise corresponding portions of the flexible plastic surface; and
      adjust the lock position of the process plant entity when the user presses on one of the plurality of fluid filled holes corresponding to the graphic representation associated with the process plant entity, wherein the process variable value for the process variable does not change in response to the finger gesture-based input while in the lock position.

20. The user interface device of claim 19, wherein when the user provides a gesture-based input indicating that the user is done adjusting the lock position of the process plant entity, the instructions cause the user interface device to decrease the amount of pressure in the fluid to lower the corresponding portions of the flexible plastic surface.

* * * * *